W. E. HASKELL.
ORGAN.
APPLICATION FILED JAN. 22, 1917.

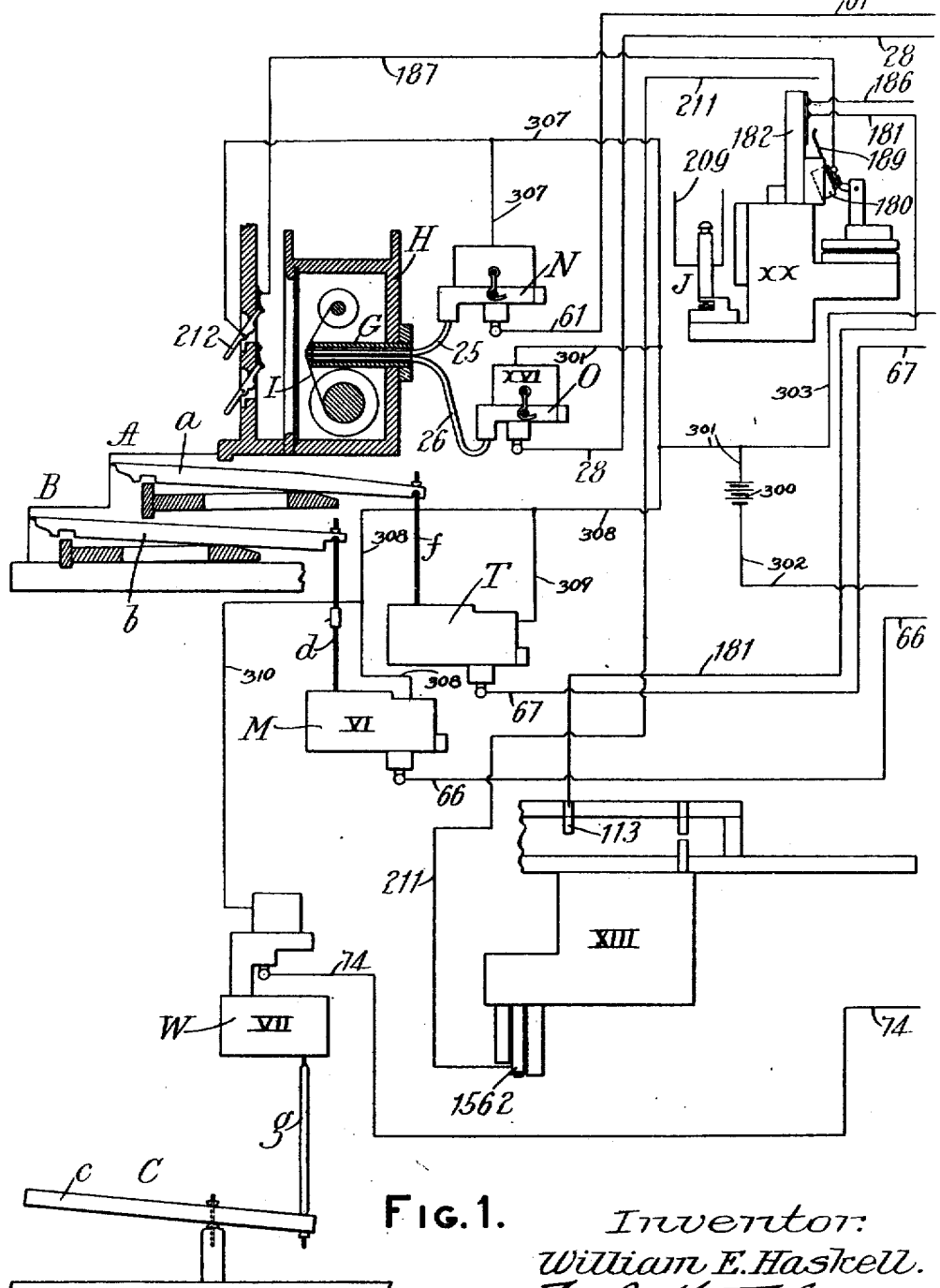

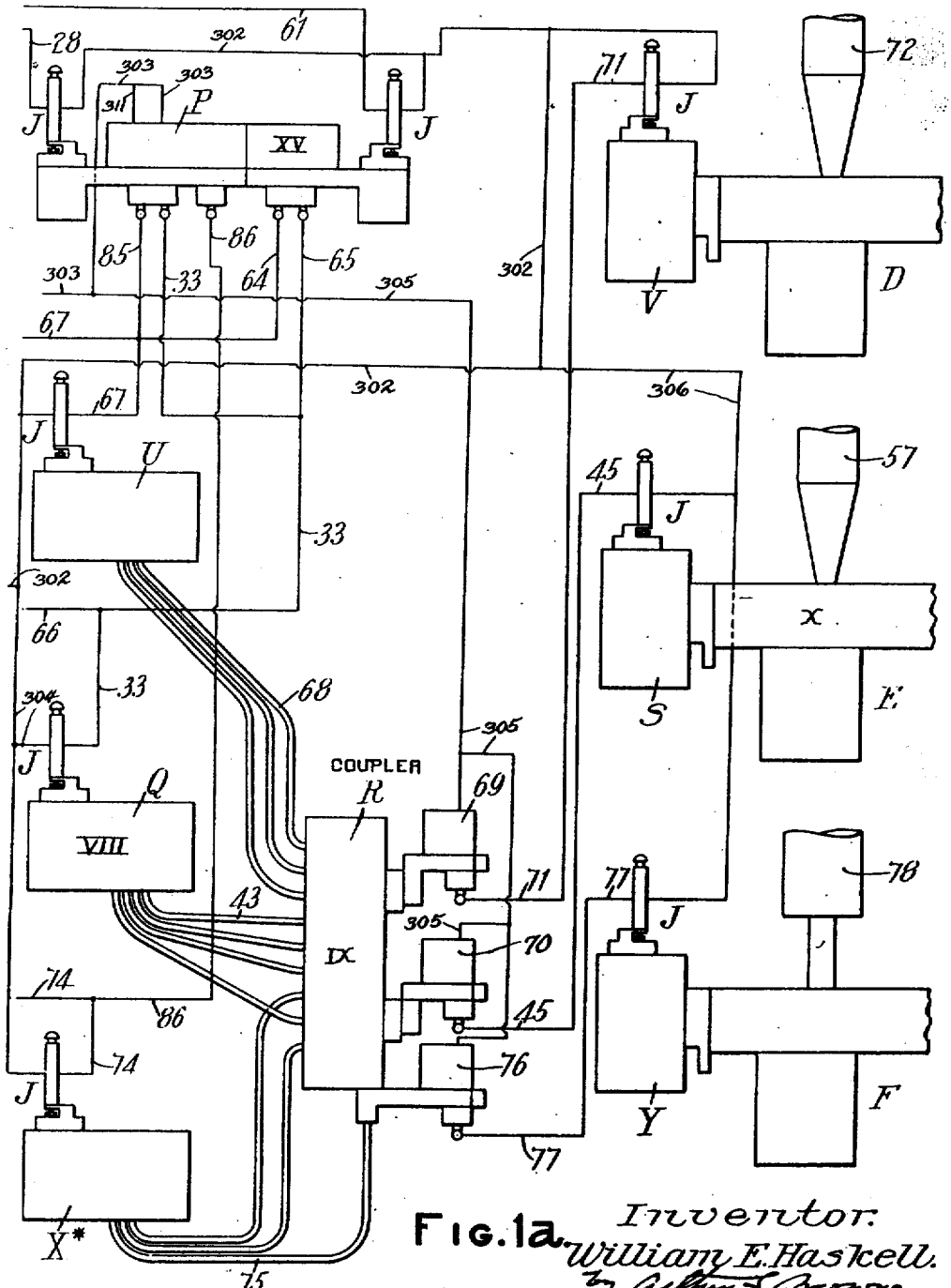

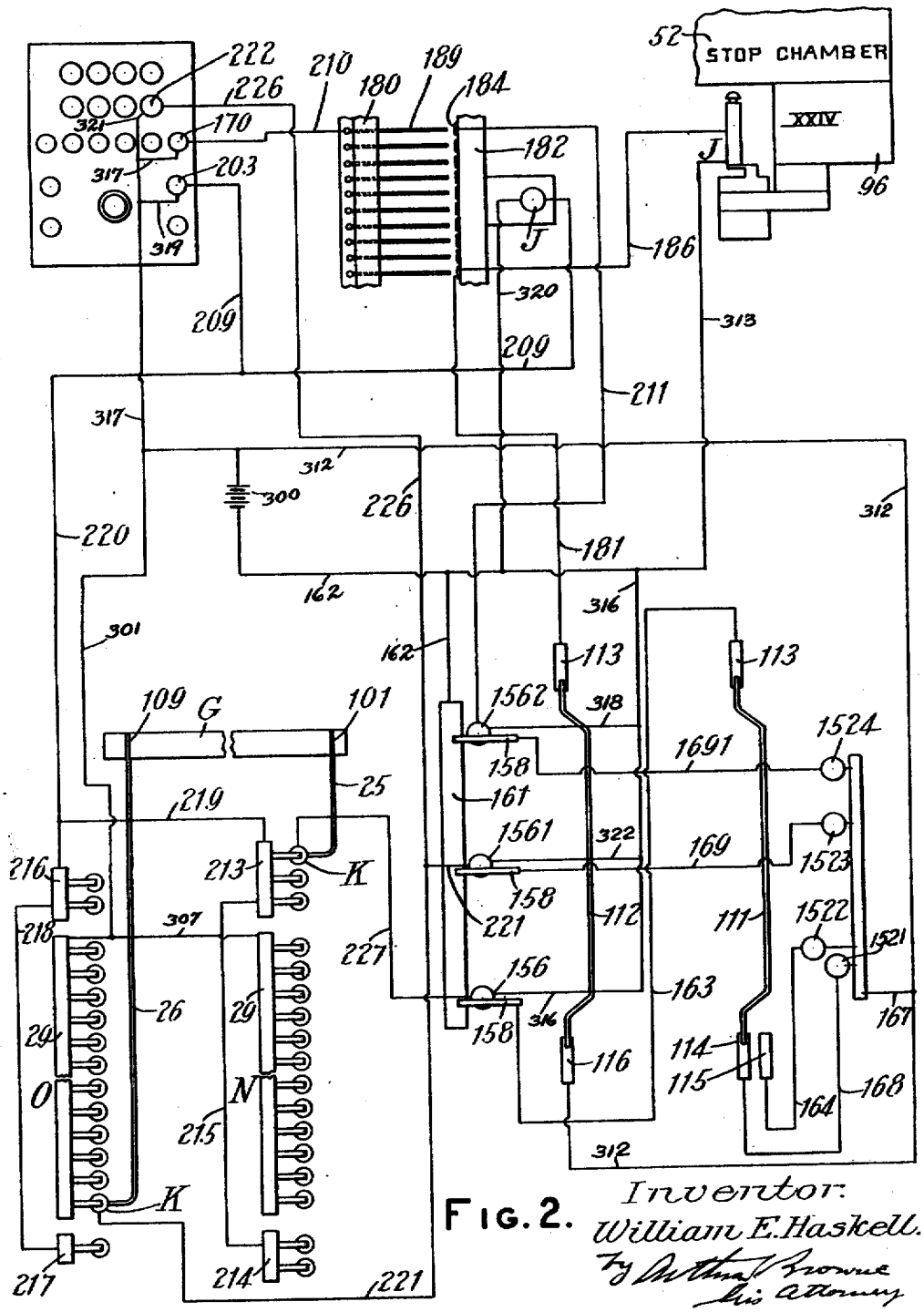

1,323,530.

Patented Dec. 2, 1919.
14 SHEETS—SHEET 4.

Inventor:
William E. Haskell.
by Arthur T. Browne
his Attorney

W. E. HASKELL.
ORGAN.
APPLICATION FILED JAN. 22, 1917.

1,323,530.

Patented Dec. 2, 1919.
14 SHEETS—SHEET 5.

Inventor:
William E. Haskell
by Arthur Browne
his Attorney

W. E. HASKELL.
ORGAN.
APPLICATION FILED JAN. 22, 1917.

1,323,530.

Patented Dec. 2, 1919
14 SHEETS—SHEET 6.

Inventor:
William E. Haskell.

W. E. HASKELL.
ORGAN.
APPLICATION FILED JAN. 22, 1917.

1,323,530.

Patented Dec. 2, 1919.
14 SHEETS—SHEET 7.

Inventor:
William E. Haskell.
by Arthur T. Browne
his attorney

W. E. HASKELL.
ORGAN.
APPLICATION FILED JAN. 22, 1917.

1,323,530.

Patented Dec. 2, 1919.
14 SHEETS—SHEET 11.

Inventor:
William E. Haskell

Inventor:
William E. Haskell

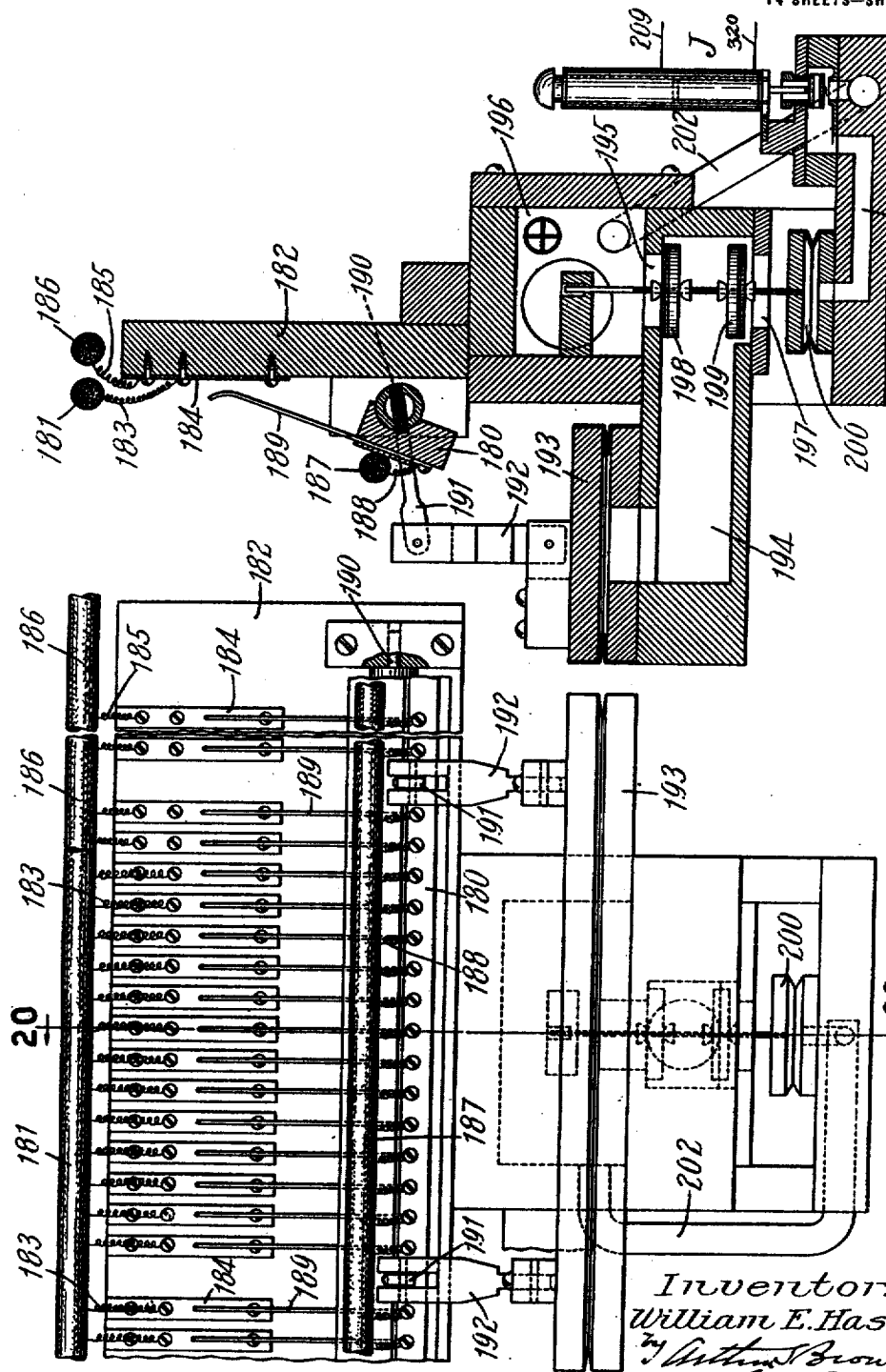

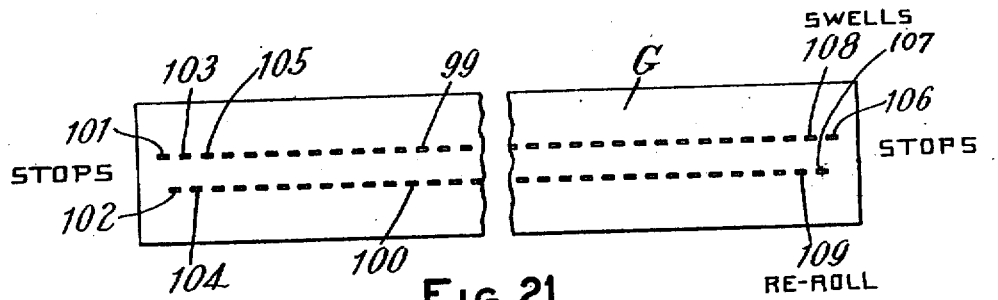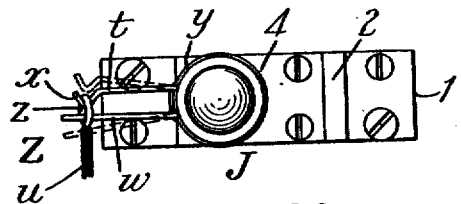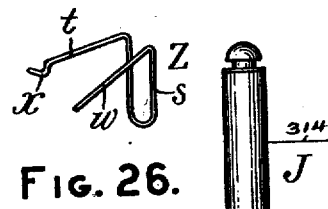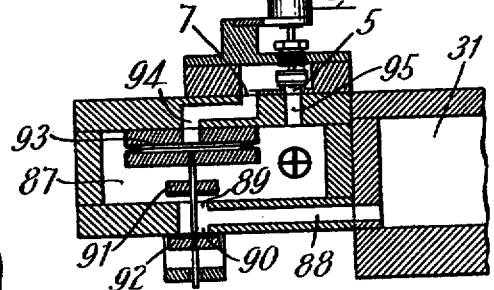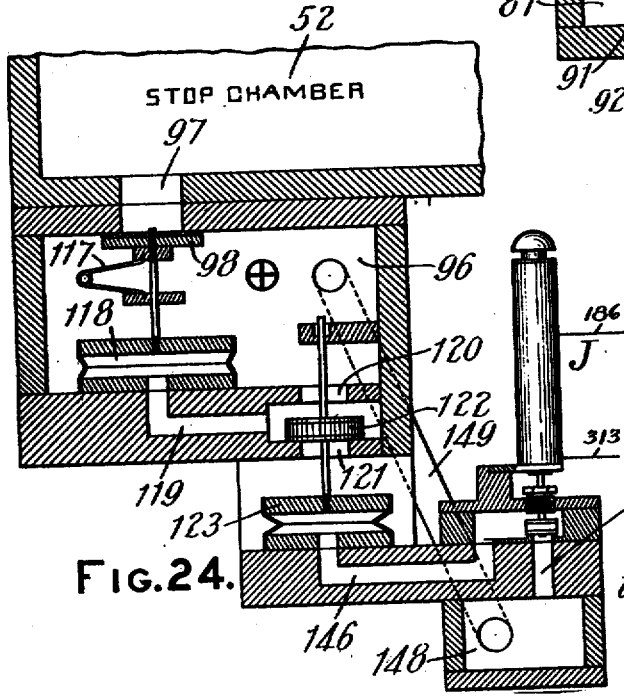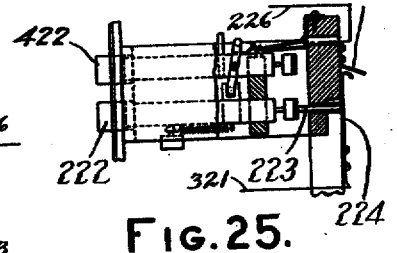

UNITED STATES PATENT OFFICE.

WILLIAM E. HASKELL, OF BRATTLEBORO, VERMONT, ASSIGNOR TO ESTEY ORGAN COMPANY, OF BRATTLEBORO, VERMONT, A CORPORATION OF VERMONT.

ORGAN.

1,323,530.   Specification of Letters Patent.   Patented Dec. 2, 1919.

Application filed January 22, 1917. Serial No. 143,750.

*To all whom it may concern:*

Be it known that I, WILLIAM E. HASKELL, of Brattleboro, in the county of Windham and State of Vermont, have invented certain new and useful Improvements in Organs, of which the following is a specification.

The present invention consists in improvements in organs which may be played automatically under the control of a perforated note sheet having desirably two sets of perforations coöperating with two rows of holes in the tracker.

The improvements relate to the organization which enables the stops and couplers to be controlled from the music sheet; to the organization which enables either row of holes in the tracker to control either or both the swell and great departments of the organ; to the organization which prevents the manual control of the stops, couplers and departments when under the control of the note sheet; to the organization which enables combinations to be controlled both automatically and by hand; to the organization which enables note sheets of different widths to be employed; and to various features of the action which is electro-pneumatic.

One embodiment of the invention is illustrated in the accompanying drawings, wherein—

Figure 3:
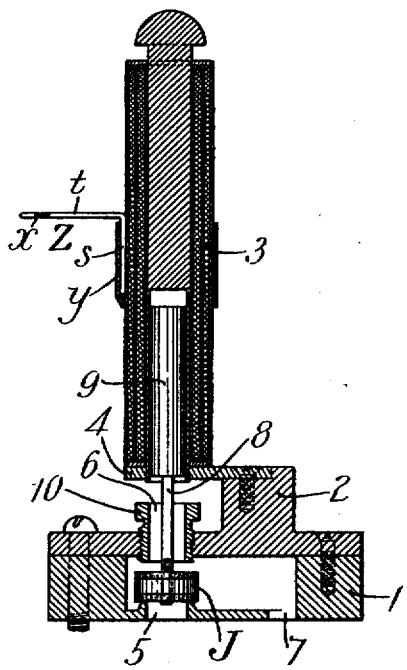
Figure 4:
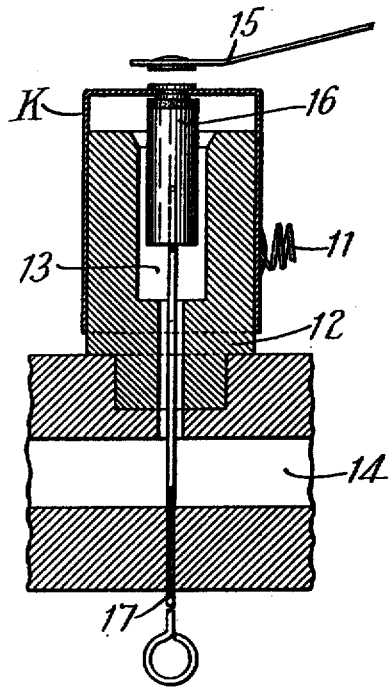
Figure 5:
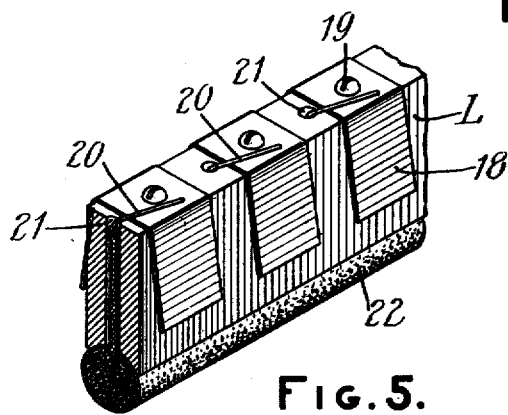
Figure 6:
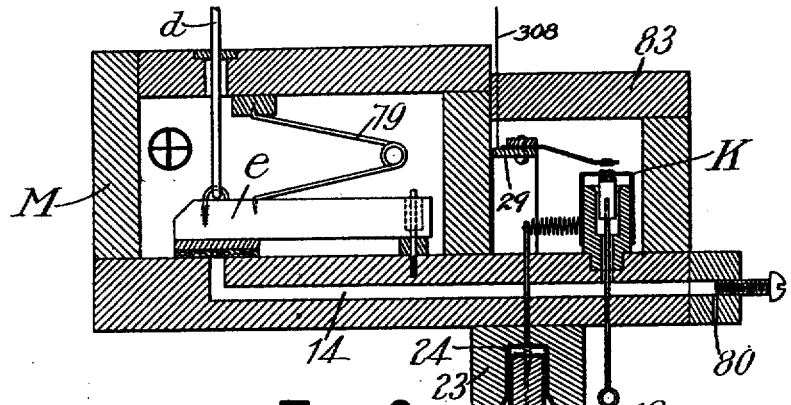
Figure 7:
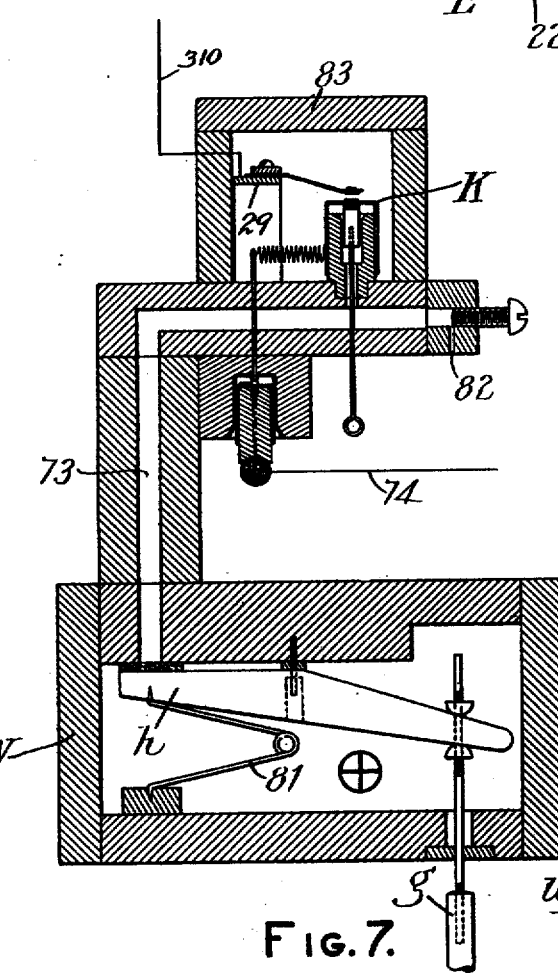
Figure 8:
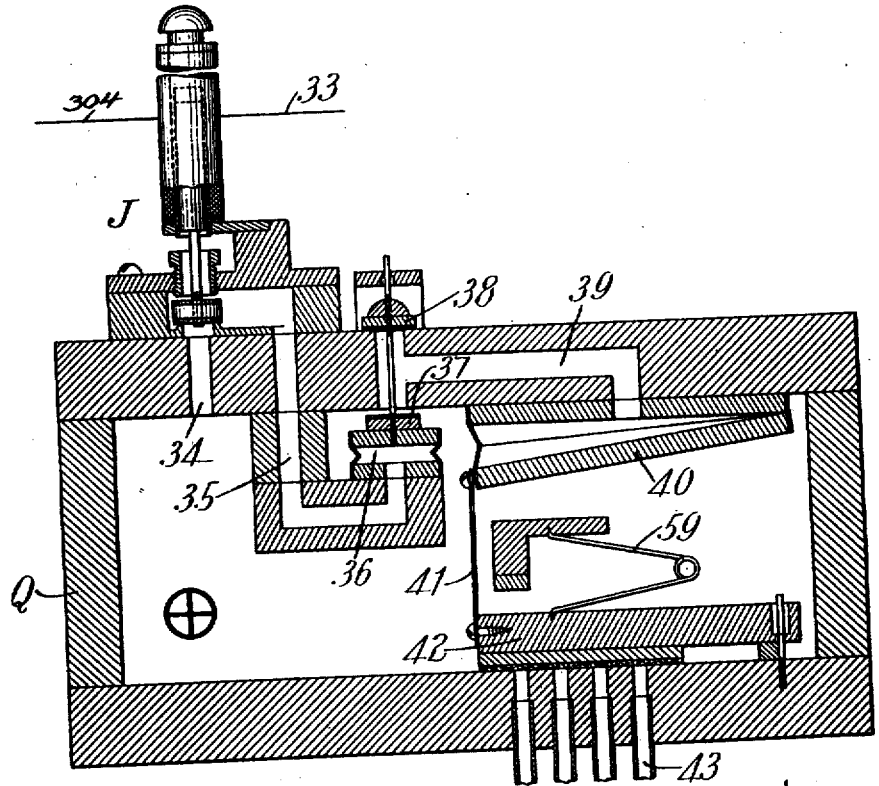
Figure 9:
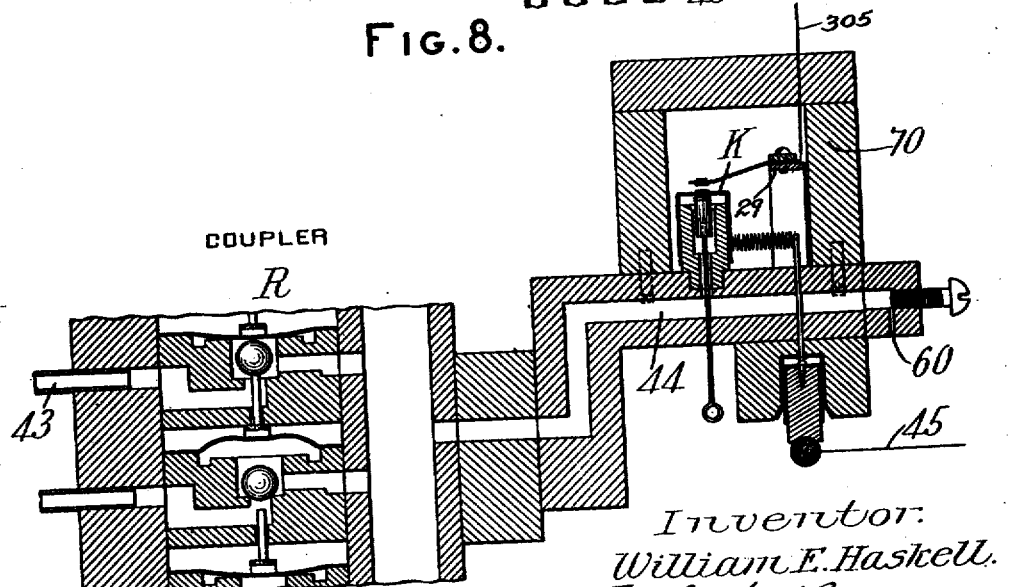
Figure 10:
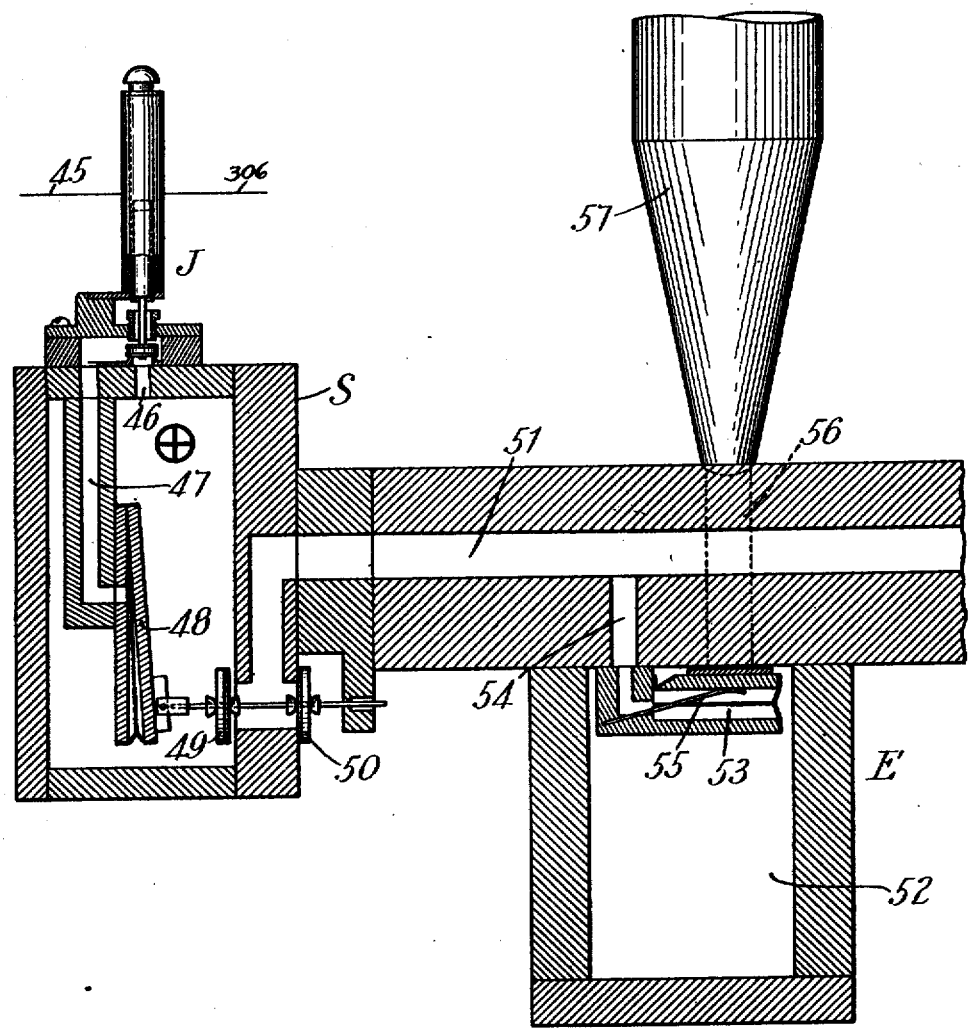
Figure 11:
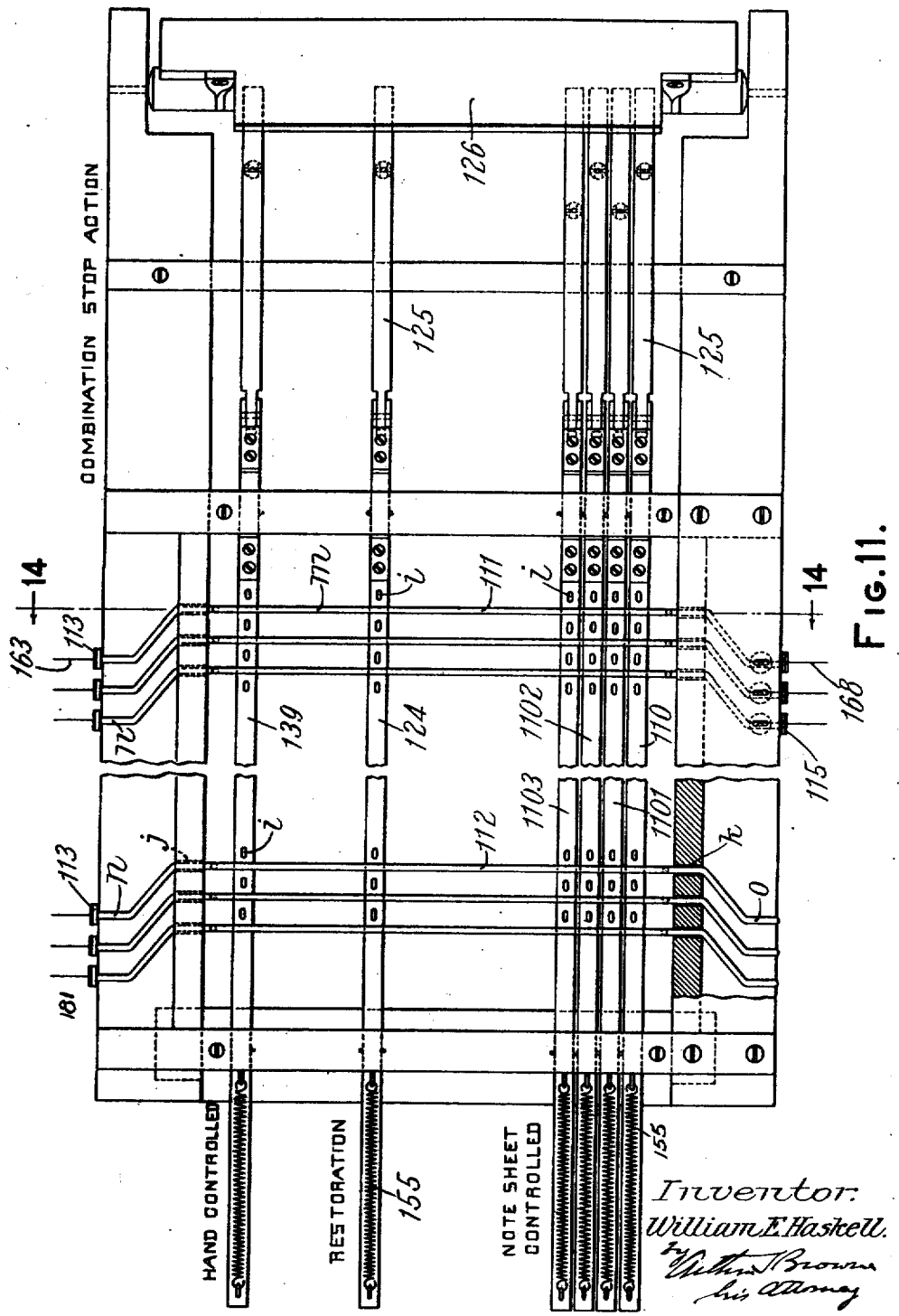
Figure 12:
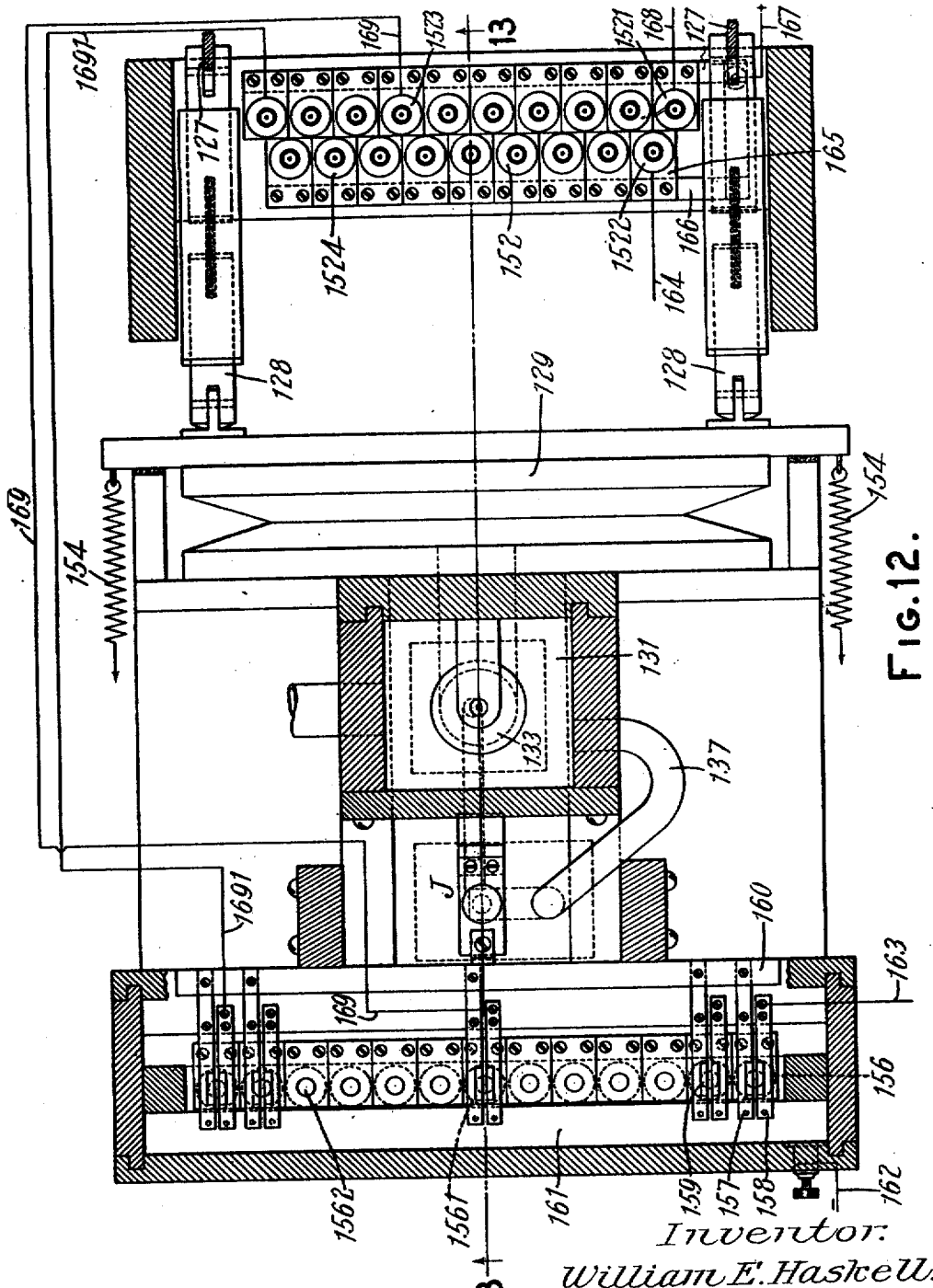
Figure 13:
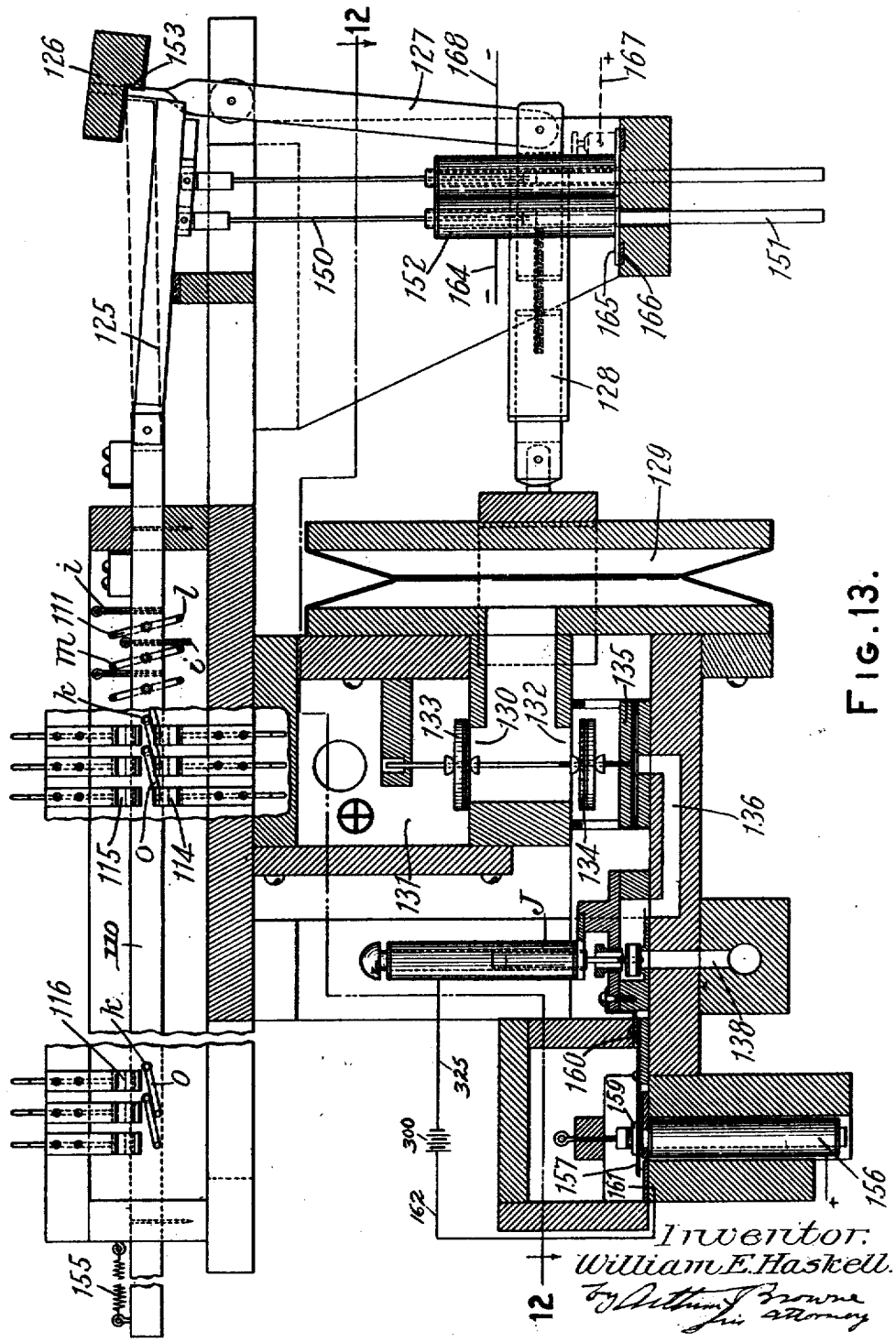
Figure 14:
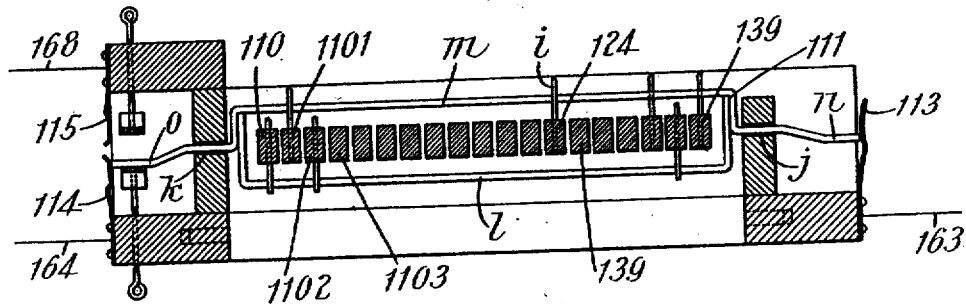
Figure 15:
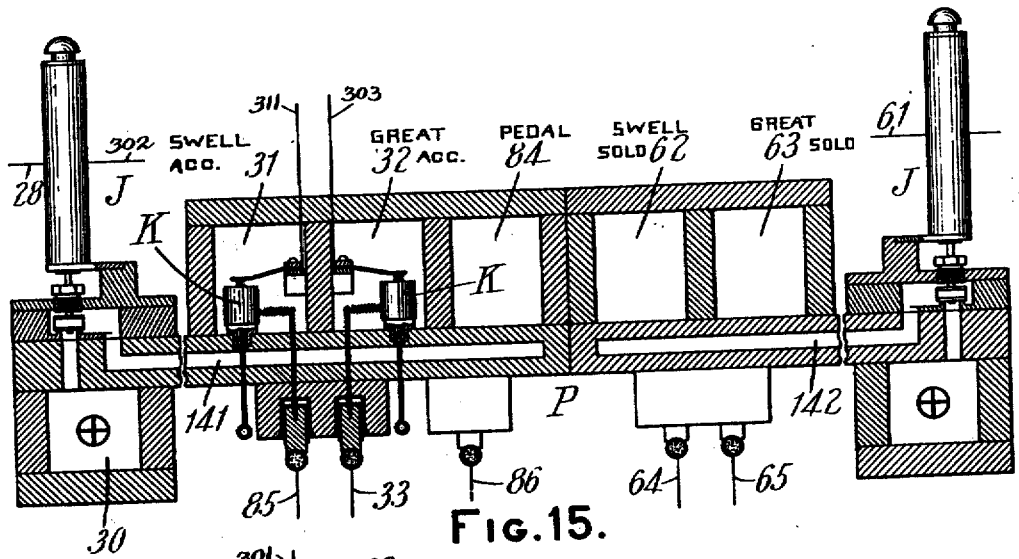
Figure 16:
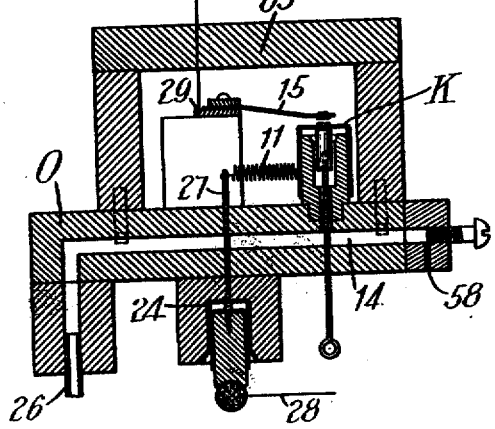
Figure 17:
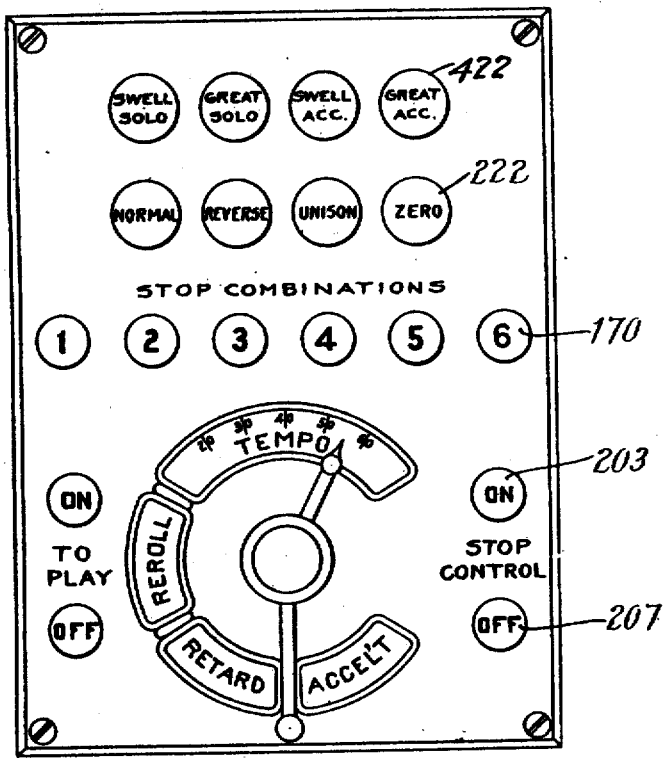
Figure 18:
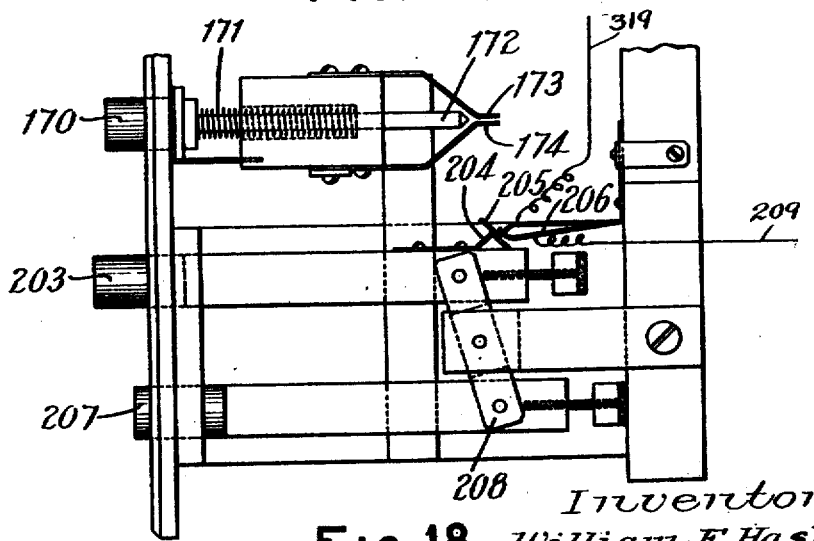

Figures 1 and 1ª, together constitute a diagram showing the electro-pneumatic connections between the organ keys and the tracker on the one hand and the sounding devices on the other. Fig. 2 is a diagram showing the connections between the tracker and manually governed switches on the one hand and the stops on the other. Fig. 3, is a detail view of the electric valve employed. Fig. 4, is a detail view of the pneumato-electric action employed. Fig. 5 is a detailed view of a portion of a rail carrying metallic electrodes. Fig. 6, is a sectional view of one of the primary chests associated with the swell or great manual. Fig. 7, is a sectional view of the primary chest associated with the pedal clavier. Fig. 8, is a sectional view of an intermediate chest between one of the primary chests and the coupler. Fig. 9, is a sectional view of a portion of the coupler and a chest associated therewith. Fig. 10, is a sectional view of a portion of one of the main chests and of a relay associated therewith. Fig. 11, is a plan view of the selective mechanism which enables combinations of stops, departments and couplers to be controlled, the mechanism being broken away at the middle so as to facilitate illustration on an adequate scale and some of the duplicated traces and rockers being omitted. Fig. 12, is a horizontal longitudinal section of the combination selective mechanism, some of the duplicated electrodes being omitted. Fig. 13, is a vertical section of the combination selective mechanism in the plane indicated by the line 13—13, in Fig. 12, only a portion of the rockers and electrodes being shown. Fig. 14, is a transverse section of the upper portion of the combination selective mechanism. Fig. 15, is a sectional view of the chest which controls the selection of the departments of the organ through the note sheet and also by hand controlled electric circuits, the electrical devices associated with a portion of the chamber being omitted. Fig. 16, is a section of a primary chest associated with one of the rows of holes in the tracker. Fig. 17, is a face view of the manually controlled switchboard. Fig. 18, is a side view of certain manually controlled switches. Fig. 19, is an elevation of the mechanism which prevents the manual control of the organ when the note sheet is in use, a part being broken away. Fig. 20, is a section in the plane indicated by the line 20—20 in Fig. 19. Fig. 21, is a plan view of the tracker. Fig. 22, is a detail view of the electric connection to the solenoids of one of the electric valves. Fig. 23, is a sectional view showing the control of air supply to one of the departmental selecting chambers. Fig. 24, is a sectional view showing the control of air supply to one of the stop chambers. Fig. 25, is a side view (on a smaller scale) of one of the manually controlled switches. Fig. 26, is a perspective view of an elastic connector.

In the diagrams, Figs. 1, 1ª, and 2, the Roman numerals VI, VII, VIII, IX, X, XIII, XV, XVI, XX, and XXIV, appearing on certain parts indicate the figures of the drawings in which such parts are respectively shown in detail. In the several chests and supply boxes in which a constant pressure is maintained during the playing of the organ, the customary indicating symbol consisting of a cross within a circle is placed.

As illustrated in Figs. 1 and 1ᵃ, the improvements are shown as applied to an organ having a swell manual A, a great manual B, a pedal clavier C, and swell, great and pedal main wind chests D, E and F, respectively. A tracker G, having two sets of perforations (Fig. 21) is employed which is located within a box H, which can be made air tight during playing and which coöperates with a note sheet I, having two sets of perforations coöperating respectively with the two rows of perforations in the tracker.

The electro-pneumatic action utilizes several features of special construction which are so frequently employed that a preliminary understanding of them is requisite.

*Electric valves.*—One of the electric valves J, is illustrated in detail on a large scale in Fig. 3. A metallic base 1, supports an attached bracket 2, with a plate 4, which carries a solenoid coil 3. The base 1, has a channel with three outlets 5, 6 and 7. Between the outlets 5 and 6 (which are in line with each other and supplied with valve seats) is a double acting valve J, with padded faces on both sides. This valve is connected by a stem 8, to the solenoid core 9. Normally the valve J, occupies the position shown in Fig. 3, with the outlet 5, closed, and the outlets 6 and 7, in communication. If the coil 3, is energized the core 9, and the valve J, will be lifted. Then, the outlet 6, will be closed and the outlets 5 and 7 will be in communication. The outlet 6, is in an adjustable thimble 10, screwing into the bracket 2, thus controlling the length of movement of the valve. The outlet 6, is open to the atmosphere, and constitutes a vent. The other two outlets 5 and 7, are in communication with passages through which air flows when the valve is lifted.

*Pneumato electric actions.*—One of the pneumato electric actions K, is shown in detail on a large scale in Fig. 4. It is an inverted metallic cup (copper preferably) having a permanently attached coiled wire 11, so that it constitutes the terminal of an electric circuit. It fits with an easy sliding fit upon a fixed piston 12, which is composed of plumbago. This insures a non-corrodible organization which permits the pneumato electric actions to readily slide and still to maintain a sufficiently close fit to avoid objectionable air leakage. The piston 12, has a hollow bore 13, establishing a permanent pneumatic connection between the interior of the pneumato electric actions K, and a channel 14, in the support for the piston. When air under pressure is admitted into the channel 14, it passes through bore 13, into the interior of the pneumato electric actions K, thereby lifting the latter until it touches the spring contact 15, which constitutes the opposite terminal of an electric circuit. Thus the electric circuit is completed. When the channel 14, is vented, the pneumato electric action K, drops thus breaking the circuit. The pneumato electric action is adjusted by means of a padded stop 16, on the end of an adjustable rod 17. The coiled wire 11, offers no sensible resistance to the rise and fall of the pneumato electric action. The spring contact 15, enables the pneumato electric action K, to make a silent contact, and avoids objectionable noise. The spring contact is connected with a fixed bus-bar, as shown, for example, at 29, in Fig. 16.

Such pneumato-electric actions are primarily pneumatics being controlled by air, and they are also switches acting to open and close electric circuits. For brevity, they will be referred to in the following description as "pneumatics", but in the claims they will be referred to as "pneumato electric actions" in the event that their electric circuit controlling action is included.

*Electrode supporting rail.*—In an organ having an electro-pneumatic action, each key, and each tracker hole ultimately controls one or more electric circuits thus involving a corresponding number of individual electrodes. Each manual commonly has sixty-one keys, each having its own electrode, all alike. Similarly, each row in the tracker has commonly fifty-eight holes governing sounding devices, and in the present invention there are additional holes governing stop combinations, the different departments, and the rewinding. Again in the pedal clavier there are, as a usual number, thirty levers. In accordance with the present invention, there is a single detachable rail carrying electrodes corresponding with the several indicated situations. Such a rail L, is partially shown in Fig. 5. The rail is of wood, or similar non-conductor, and it has as many metallic electrodes 18, as there are keys in the corresponding manual, levers in the corresponding clavier, or holes in the corresponding tracker row. Each electrode has elastic legs on opposite sides of the rail, and is fastened to the edge of the rail by a screw 19. A wire 20, is secured to each electrode and passes through a hole 21, in the rail. At the opposite edge of the rail to where the electrodes are fastened all of the wires 20, unite in a cable 22, which extends lengthwise of the rail and close to the edge. The cable leaves the rail at one end, and thence extends to the part of the organ where are located the contrivances controlled by the several electric circuits. Each rail L, with its attached electrodes and cable is readily attached to and detached from the appropriate location. For example, referring to Fig. 6, the rail L, there shown fits into a wooden socket 23, at the bottom of the primary chest M, associated with the swell manual. This socket has separated fixed electrodes 24, one for each of the sixty-one keys of the swell manual. Each electrode 24, is forked to straddle the corresponding elastic electrode 18 on the detachable rail. The elasticity of the electrodes 18, on the rail insures proper electric contact with the fixed electrodes 24, and affords adequate friction to retain the rail in place.

*Tracker action.*—The tracker G, is connected by two sets of tubes 25 and 26 (Fig. 1), with two channeled tube bars N and O, respectively. The two tube bars are alike, and tube bar O, is shown in detail in Fig. 16. Each tube 26, communicates with a channel 14, in the bottom of the tube bar which controls a primary pneumatic K, located on the tube bar. When the appropriate hole in the note sheet I, registers with the proper hole in the tracker bar, air under pressure flows from the box H (Fig. 1) through tube 26, and channel 14 (Fig. 16), and beneath the pneumatic K, thereby lifting said pneumatic and closing an electric circuit. This circuit includes a metallic rod 27, connecting coiled wire 11, with electrode 24, and outgoing wire 28. The circuit also includes the fixed bus-bar or feed bar 29, on the tube bar O, to which the contact 15, for each pneumatic K, upon the tube bar is connected.
The feed bar 29, is connected by a wire 301, (Fig. 16) with an electric generator 300, as shown in Fig. 1.

As shown in Figs. 1 and 1ª, the wire 28 leads to an electric valve J, on the department-selecting chest P. From the solenoid of this valve J, a return wire 302 (Figs. 15, 19, and 1) leads to the generator 300. The department selecting chest P, is shown in detail in Fig. 15. When the circuit including the wire 28, is closed, as just stated, the corresponding valve J, (at the left in Fig. 15) is lifted, thereby permitting the flow of air from constant pressure supply box 30, to channel 141, which communicates with two pneumatics K, K, located respectively in wind chambers 31 and 32. These chambers normally contain air under pressure, thus balancing the pressure admitted to the channel 141. But when playing is to be done, either (or both) of the chambers is exhausted as will be hereinafter explained. Assume, at present, that chamber 32, has been exhausted, and now contains air at atmospheric pressure. Then when air
is admitted to channel 141, the correspond-
ing pneumatic K, in chamber 32, is lifted, and an electric circuit is closed which includes the wire 303 (Figs. 1, 1ª, and 15) leading from the generator 300, and the outgoing wire 33.
As shown in Fig. 1ª, this wire extends to an electric valve J, on the intermediate great chest Q. The circuit is completed from the solenoid of such valve by return wire 304 (Fig. 8), which is shown in Fig. 1ª, as leading to the generator by way of a connection with wire 302. The intermediate chest Q, is shown in detail in Fig. 8. It contains air under pressure, and is in communication with the valve J, through the channel 34.

It is also communicates with the open air through a passage normally closed by a valve 38. This valve and a companion valve 37, are connected to a pneumatic 36, the interior of which normally is vented by the passage 35. Since the area of the pneumatic 36, is greater than that of the outlet controlled by the valve 38, said pneumatic is ordinarily collapsed and the valve 38 is closed, as shown in Fig. 8. In the event, however, that the solenoid of valve J, is energized, said valve is lifted, thus closing the vent of passage 35, and putting said passage into communication with chest Q, through channel 34. Therefore, air under pressure flows into the pneumatic 36, thus fitting it in equilibrium. Accordingly, the air pressure on the underside of valve 38, opens it, and valve 37 closes, thereby venting the channel 39, to the atmosphere. Channel 39, communicates with the interior of a pneumatic 40, located within the chest Q. When the channel 39, is vented, the air pressure in the chest collapses the pneumatic 40, lifting its bottom movable board. The pneumatic 40, is connected by wire 41, to a valve 42, within the chest Q which normally closes a plurality of ports which communicate with corresponding pipes leading to a coupler R. Four such pipes are shown. The lifting of the valve 42, due to the collapse of pneumatic 40, permits the air from the chest Q, to flow through such pipes as the condition of the coupler permits. Assume that the direct coupler stop is drawn the air will flow through only the unison pipe, say the pipe 43.

The coupler R, which is illustrated only in part in Fig. 9, is similar, to that set forth in United States Letters Patent No. 1,078,- 851, dated November 18, 1913. It may be identical, but as shown, differs in that there is a direct or unison coupler for the great organ. As explained in that patent, the air entering the coupler through the unison pipe 43, will emerge from the coupler and enter the channel 44, communicating with a pneumatic K, pertinent to the great organ, thereby lifting said pneumatic and closing the electric circuit which includes the wires 303, and 305 (Figs. 1, 1ª, and 9) leading from the generator 300 and the wire 45.

The wire 45, (Fig. 1ª) extends to an electric valve J, on a relay supply box S, coöperating with the great organ main wind chest E, as best shown in Fig. 10. The solenoid of this valve is connected with the generator 300, by the return wires 306, and 302, as shown in Figs. 1, 1ª, and 10. The supply box S, contains air under pressure; and, when the valve J, is lifted, air from the supply box flows through passages 46 and 47, to the interior of a pneumatic 48, thus equalizing the external and internal pressures thereof. Connected with the pneumatic 48, are two valves 49 and 50 controlling opposite ports of a channel 51. Normally valve 50, is closed (owing to the normally unbalanced external pressure on the pneumatic 48) and channel 51, is in communication with the supply box S. When air is admitted to the interior of the pneumatic 48 (as just described) the air pressure on the valve 50, moves it outwardly, thus closing valve 49, and venting the channel 51, to the open air.

The channel 51, coöperates with all of the stop chambers of the great organ, in the same manner as shown in connection with the single stop wind chamber 52, shown in Fig. 10. When the stop governing the chamber is drawn, air under pressure enters the chamber, and the external and internal pressures upon the pneumatic 53, are equal, that pneumatic communicating with the channel 51, through the passage 54. The pneumatic is normally expanded by a spring 55, so that it closes the wind passage 56 (shown in dotted lines) leading to the speaking pipe 57. When the channel 51, is vented (as above described) the pressure within the pneumatic 53, is relieved, and the pressure within the chamber 52, acting on the movable top of the pneumatic 53, collapses the pneumatic, thereby opening the passage 56. Thereupon, air flows from the chamber 52, through the passage 56, and the pipe 57, sounds.

When the travel of the note sheet closes the hole (heretofore indicated) in the tracker, the following sequence of actions occur: Pipe 26 (Fig. 16) and channel 14 are vented through the bleed 58, and the pneumatic K, on the bar O, drops thus breaking the circuit which includes the wire 28. This deënergizes the solenoid of the electric valve J, shown at the left in Fig. 15, and said valve closes, thus venting the channel 141, to the open air (through the port 6, as shown in Fig. 3). Thereupon the pneumatic K, in chamber 32, drops, thus breaking the electric circuit which includes the wire 33. This deënergizes the solenoid of the valve J, in Fig. 8, and that valve drops thus venting the channel 35, to the open air. Thereupon, the air pressure in the chest Q, acting on the top of pneumatic 36, collapses it; the valve 38, closes the vent of the channel 39; and, the valve 37, being open, the air from chest Q, flows through the channel 39, to the interior of the pneumatic 40, thereby counterbalancing its external and internal air pressures. Thereupon the spring 59 (Fig. 8), aided by gravity expands the pneumatic 40, and closes the valve 42. Thereupon the pipe 43, and channel 44 (Fig. 9), are vented by bleed 60. As the result, the electrode K, in Fig. 9, drops, thus breaking the circuit which includes the wire 45. This deënergizes the solenoid shown in Fig. 10, so that its valve J, drops, thereby venting the passage 47, to the atmosphere. The air pressure within the supply box S, now collapses pneumatic 48, thus closing valve 50, and opening valve 49. Thereupon air from supply box S, enters channel 51, past valve 49, and the interior of pnuematic 53, through passage 54, thus equalizing the air pressure within and without said pneumatic. The result is that spring 55, expands the pneumatic 53, thus closing the passage 56, and the pipe 57, ceases to speak.

It has been described and illustrated in detail how one aperture in the note sheet registering with one hole in the tracker causes one pipe to sound. The holes in the tracker when uncovered by the corresponding apertures in the note sheet act in the same way through similar mechanism. As now customary there are fifty-eight holes in the lower row of the tracker, and there are fifty-eight of the pipes 26, communicating with said holes and fifty-eight channels 14 in the bar O (Fig. 16), each communicating with its own pneumatic K. There are fifty-eight of the wires 33, leading to fifty-eight electric valves J, on the chest Q (Fig. 8). As this chest Q, coöperates also with the great organ manual (as hereinafter explained) it has three additional valves J, making sixty-one in all, to conform to the usual number of keys in a manual. The chest Q, has sixty-one pneumatics 36, sixty-one pneumatics 40, and sixty-one valves 42. Also, referring to Fig. 9, there are sixty-one of the pneumatics K, there shown, and sixty-one wires 45; and, referring to Fig. 10, there are sixty-one valves J, sixty-one pneumatics 48, with their respective valves, and sixty-one passages 54. There are as many of the chambers 52, as there are speaking stops in the great organ, and with each stop there are as many pipes 57, as is customary for the several stops.

Likewise, there are fifty-eight holes in the the upper row of the tracker communicating with as many pipes 25, leading to the tube bar N, which is like the bar O. The busbar of the upper tube bar O, is connected with the generator by the wires 301, and 307, Fig. 1. Fifty-eight wires 61 (Fig. 1) lead to fifty-eight electric valves J, at the right hand end of the chest P, as shown in Figs. 1ª and 15. There are fifty-eight of the pneumatics K, in each of the chambers 62 and 63, and fifty-eight wires 64, and fifty-eight wires 65, lead respectively from these chambers. Each wire 65, joins one of the wires 33, as shown in Fig. 2, so that, when air is exhausted from chamber 63 (as hereinafter explained), the exposure of a hole in the upper row of the tracker will sound one (or more) pipes in the great organ.

As will be hereinafter explained in connection with chest P, the swell organ can also be played from either row of holes in the tracker, and the pedal organ may be played from the lower tracker holes. Before explaining this it is desirable to know how the keys and pedal levers perform their offices.

*Great organ action.*—When a key *b*, of the great organ manual B, is played, an abstract *d*, is lifted (Fig. 1), and with it a valve *e*, in the great primary chest M (Fig. 6). This permits air under pressure to flow from chest M, into channel 14, and to lift pneumatic K, thereby closing the circuit which includes wires 301, and 308, (Figs. 1, and 6) leading from the generator and the outgoing wire 66 (Fig. 6). This wire 66 (Figs. 1 and 1ª), joins the wire 33, and hence the corresponding valve J, of chest Q, is lifted. The action from this point through chest Q, coupler R, and relay supply box S, to the great organ main wind chest E, is identical with that involved when the music sheet is employed, and as already explained.

*Swell organ action.*—When a key *a*, of the swell organ manual A, is played, an abstract *f*, is lifted, thus opening a valve in the swell primary chest T, which is identical in construction with the chest M, shown in Fig. 6. The result is to close a circuit including wires 301, 308, and 309 (Fig. 1) from the generator and a wire 67 (Figs. 1 and 1ª) which leads to an electric valve J, on the intermediate swell chest U, which is identical with chest Q, as shown in Fig. 8, excepting, as shown in Fig. 1ª, in the specific organ illustrated, only three rows of pipes 68, lead from it to the coupler R. Each unison pipe 68, coöperates with a pneumatic in the top box 69, which is just like the intermediate box 70, shown in Fig. 9. The lifting of a pneumatic in the box 69, closes a circuit which includes a wire 71 (Fig. 1ª), which leads to an electric valve J, on the relay supply box V, of the main swell wind chest D. These parts V and D, are similar to the great parts S and E, as shown in Fig. 10; and a pipe 72 of the swell organ is sounded in just the same way as a pipe 57, of the great organ.

*Pedal action.*—When a foot lever *c* (Fig. 1), is played, an abstract *g*, is lifted. As shown in Fig. 7, this opens a valve *h*, in the primary pedal chest W, and permits air under pressure to flow through passage 73, into the pneumatic K, which lifts and closes the circuit which includes connections 301, 308, and 310 (Fig. 1) from the generator and the wire 74. This wire 74 (Figs. 1 and 1ª) leads to an electric valve J, on an intermediate chest X*, which is identical with the chest Q (Fig. 8), except that, as shown only three groups of pipes 75, lead from chest X*. The unison pipe 75, leads directly to a pneumatic in the lower coupler box 76, which is like the box 70, shown in Fig. 9. The lifting of a pneumatic in the box 76, closes a circuit which includes the wire 77, leading to an electric valve J, of the relay supply box Y, connecting with the main pedal wind chest F. The parts Y, and F, are similar to the parts S and E, as shown in Fig. 10, and a pedal pipe 78, is sounded in just the same way as one of the great organ pipes 57.

*Restoration.*—When a depressed key in the great manual is released, a spring 79 (Fig. 6), closes valve *e;* passage 14, is vented at the bleed 80, and pneumatic K, drops, breaking the circuit which includes the wire 66. From that point to the pipe the restoration to normal is identical with that heretofore described in connection with the tracker action. Likewise, when a depressed pedal lever is released, a spring 81, (Fig. 7), closes valve *h*, passage 73, is vented at the bleed 82, the circuit including the wire 74, is broken, and the pipe ceases to sound as in the case described in connection with the tracker action.

Referring to Fig. 6, it is to be noted that there are as many valves *e*, and pneumatics K, as there are keys in the great manual, usually sixty-one. Also, referring to Fig. 7, there are as many valves *h*, and pneumatics K, as there are levers in the pedal clavier, usually thirty.

*Pneumatic protection.*—To prevent accidental injury to the pneumatics K, and to exclude dust which might interfere with their free movement, they are incased. The boxes 69, 70 and 76 (Figs 1ª and 9) have already been mentioned. Similar boxes are also shown at 83, in Figs. 6, 7 and 16. Each of these boxes is sufficiently tight to exclude the entrance of detrimental dust, but is vented enough to maintain atmospheric pressure in the interior so as to permit the free rise of the pneumatics. The several boxes are detachably secured in place by hooks as shown in Fig. 1, in connection with the bars N and O. The chambers which contain the pneumatics K, as shown in Fig.

15, are air tight and normally contain air under pressure, as hereinafter described, and serve to protect the inclosed pneumatics.

*Departmental selection.*—As shown in Fig. 15, there are in the departmental chest P, four chambers 31, 32, 62 and 63, each containing sixty-one pneumatics K, and a fifth chamber 84, containing thirteen pneumatics. The pneumatics K, are not shown in the chambers 62, 63, and 84, but in practice are there used. The three chambers 31, 32 and 84, communicate with passages 141, for each of which there is an electric valve J, controlled by one of the lower row holes in the tracker as already explained. Normally, each of the chambers 31, 32 and 84, contains air under pressure so that each contained pneumatic K, is balanced if air is admitted to a passage 141, so that it does not lift and, hence, is inoperable. In the event, however, that air is exhausted from any one chamber its pneumatics K, become operable and will be lifted if air is admitted to the corresponding channel 141. It has already been explained how, if chamber 32, is exhausted a pipe in the great organ will sound. Similarly, if chamber 31, is exhausted, and air enters one of the channels 141, one of the pneumatics K, in chamber 31, will be lifted thus closing a circuit including connections 303, (Figs. 1, and 1ª) and 311 (Figs. 1ª, and 15) from the generator and wire 85. That wire joins wire 67 (Fig. 1ª), and hence a swell pipe is sounded, as explained in connection with the swell action. Likewise, if the chamber 84, is exhausted, and air enters one of the channels 141, communicating with one of its pneumatics, a circuit will be closed which includes a wire 86. That wire joins wire 74 (Fig. 1ª), and a pipe of the pedal organ sounds, as explained in connection with the pedal action.

It has already been explained in connection with the tracker action how one of the upper row holes of the tracker acts to sound a great organ pipe when chamber 63 (Fig. 15), is exhausted. If chamber 62, is exhausted, and air enters a passage 142, then a circuit is closed which includes a wire 64. This wire joins wire 67, and hence a pipe of the swell organ sounds, as explained in connection with the swell action.

With this organization, the solo part of a composition (which is usually represented by note holes in the note sheet registering with the upper row of tracker holes) can be played on the swell organ or on the great organ, or on both; the accompaniment (usually controlled by note holes registering with the lower row of tracker holes) can be played on the great organ, or on the swell organ, or on both; and the pedal organ can also be played as part of the accompaniment.

The admission and exhaustion of air to and from the several chambers 31, 32, 84, 62 and 63, are the same for each, and are illustrated in Fig. 23, in connection with chamber 31. As here shown, the chamber 31, is in communication with air trunk or control box 87, through passage 88, and port 89, and with the atmosphere through port 90. These ports are controlled respectively by valves 91 and 92, which are connected to a pneumatic 93. This pneumatic communicates by passage 94, to the port 7, of the electric valve J. The port 5, of valve J, communicates by passage 95, with the control box 87. Normally, the solenoid of the valve J, is not energized; and, the valve J, being heavy enough, stays down, the pneumatic is vented through passage 94, and port 6, and the port 89, (being smaller than the cross area of the pneumatic) is open, so that air pressure is maintained in chamber 31. When, however, the solenoid of valve J, is energized, the valve lifts and air flows from box 87, through passage 95, ports 5 and 7, and passage 94, to the pneumatic 93, thereby equalizing the pressure inside and outside said pneumatic. Thereupon the pneumatic expands by gravity, thus closing valve 91, and opening valve 92, thereby exhausting the chamber 31. The chamber 31, remains vented as long as the valve J, remains open.

The solenoids of the valves which control the several departmental chambers 31, 32, 62 and 63, are in electric circuits which can be governed by the hand-controlled switches which are set forth in Letters Patent of the United States No. 1,230,895, June 26, 1917. As herein shown, they are also governed automatically from the note sheet. This automatic control is through the same mechanism which also automatically selects the stop combinations and will be described in connection therewith.

*Tracker.*—In the specific organ herein illustrated, the tracker, as shown in Fig. 21, not only has the usual upper and lower rows of note holes 99 and 100, but it also has additional holes 101, 102, 103, 104, 105, 106, 107, 108 and 109, coöperating with corresponding apertures in the note sheet. Six of these holes, 101 to 106, govern the stop combinations and also the departments and couplers. Two of the holes 107 and 108, govern the swell shades, and the remaining hole 109, governs the re-roll of the note sheet, the air supply to the tracker box, and ultimately the stoppage of the organ, as set forth in companion applications for Letters Patent of the United States filed February 7, 1917, Serial Number 147,092; and filed March 16, 1917, Serial Number 155,171. The hole 109, also restores any active stop combinations to idle position as hereinafter explained.

Each of the holes 101, 103, 105, 106 and 108, is connected by a tube 25 (Fig. 1), with a pneumatic K, in the box N, and each hole 102, 104, 107, and 109, is connected by a tube 26 (Figs. 1 and 2), with a pneumatic K, in the box O.

When any one of these nine supplementary holes registers with an aperture in the note sheet, the corresponding pneumatic K, closes an electric circuit and the desired result follows.

*Stop control.*—The supply of air to each stop chamber is effected in the same manner, and is illustrated in Fig. 24, in connection with stop chamber 52.

The stop chamber 52, communicates with a supply box 96, (Fig. 24) containing air under pressure, through a port 97. This port is normally closed by a valve 98, lifted by a spring 117, and connected with a pneumatic 118, the interior of which normally communicates with the supply box by passage 119, and port 120. The pneumatic 118, may be vented through a port 121, which is normally closed by a valve 122, connected with a normally collapsed pneumatic 123, the interior of which is normally vented through passage 146, at the electric valve J. This valve normally closes a passage 147, leading to a channel 148, (common to all the stops of the department) which communicates with the supply box through conductor 149. When the solenoid of the valve J, is energized, said valve lifts so that air flows from box 96, through conductor 149, channel 148, passages 147 and 146, to pneumatic 123, which expands and lifts valve 122, so that port 120, is closed, and port 121, is opened. Pneumatic 118, is thus vented, and is collapsed by the air pressure within the box 96, so that valve 98, opens and air flows from box 96, through port 97, into stop chamber 52. A similar mechanism admits air to each coupler chamber such as shown at Y, in the aforesaid Patent No. 1,078,851 (Figs. 3 and 4; page 2, lines 122, et seq.).

*Combination selecting mechanism (automatic control).*—The combination selecting mechanism, or combination stop action is indicated as a whole at XIII, in Fig. 1, and in detail in Figs. 11, 12, 13 and 14. Each combination is immediately governed by a trace, of which nineteen are shown in Fig. 14, one being there indicated by 110. To avoid confusion only six traces are shown in Fig. 11. The traces are all alike in construction and movement. Two of the traces coöperate with each of the six combination stop holes 101, to 106, in the tracker, the organization being such that each hole controls two combinations; four of these traces being illustrated at the bottom of Fig. 11. Six of the traces are controlled from hand manipulated switches, one of them being shown at the top of Fig. 11. The nineteenth is controlled by the restoration hole 109, in the tracker, this being the trace shown at the middle of Fig. 11, and also by a hand controlled switch shown in Fig. 25.

Taking a typical trace 110 as an example, it slides longitudinally between guides, and carries a series of pins $i$, a few only of which are shown in Fig. 13. There are as many of these pins on each trace as there are stops, departmental combinations, couplers and the like adjuncts to be controlled; and, in addition, there are pins to determine the action of the holes 101 to 106, of the tracker, as to which of the two traces governed by a single hole is to act. The several pins $i$, occupy two functional positions, some extending up and others down, as indicated in Fig. 13.

Each trace coöperates through its pins with rockers, of which there are two types, trace-selecting rockers 111 and controlling rockers 112. Each rocker of both types is journaled at its ends, at $j$ and $k$ (Fig. 11), in the framework, and it has two arms $l$ and $m$ (Fig. 14), one, $l$, beneath all the traces, the other, $m$, above all the traces. Each upper arm $m$, coöperates with raised pins; and each lower arm $l$, coöperates with depressed pins. In Fig. 11, only the upper arms $m$, are shown, so as to avoid confusion.

Each rocker is of metal, and constitutes an electrical conductor and is a portion of an electric circuit, and acts as a switch. At one end (the upper in Fig. 11) each rocker (of both types) has a crank arm $n$, which is always in contact with a spring electrode 113 (Fig. 14). At the opposite end (the lower in Fig. 11) each rocker (of both types) has a crank arm $o$, which acts differently for the two types. The arm $o$, of each of the six trace selecting rockers 111, which are at the right in Figs. 11 and 13 (three only being shown) coöperates alternately with upper and lower spring electrodes 114 and 115 (Fig. 14), being always in contact with one of them, so that each of the rockers 111, always (when the organ is in action under control of the note sheet) constitutes a part of one of two electric circuits which it acts to make and break, so that it is a double acting switch. When a trace selecting rocker 111, is in the position shown in Fig. 13, its arm $o$, contacts with the co-acting lower electrode 114. When a rocker 111, is turned by movement to the left (Fig. 13) of a depressed pin $i$, its arm $o$, will contact with the co-acting upper electrode 115. Each trace selecting rocker when at rest closes one of the two circuits controlled by it.

In the case of the controlling rockers 112, of the other type, its arm $o$, coöperates with a single electrode 116 (Fig. 13) only, to make and break a single electric circuit. Normally, each rocker 112, stands in such position (like that shown for the rockers 111 in Fig. 13) that its arm $o$, is out of contact with the co-acting electrode 116. But when a rocker 112, is swung to its second position by a depressed pin $i$, moving to the left (Fig. 13), its arm $o$, contacts with its electrode 116, and the circuit including it is closed.

There is one of the controlling rockers 112, and one of the electrodes 116, for each stop of the organ, for each chamber of the department controller, and for each coupler. Fig. 2, shows one of the rockers 112, and the circuit connections through which it controls one of the stop chambers. As there shown the electrode 116, for this rocker is connected by wire 312, to the generator 300. The electrode 113, at the other end of the rocker 112, connects by wires 181, and 186, with the electric valve J, of the stop shown, and the circuit is completed by the connections 313, and 162. Another electrode 116, is in circuit with the electric valve governing the communication between the department selecting chamber 31, on the one hand, and the control box 87 (Fig. 23), and the atmosphere on the other hand. The wires 314, and 315, shown in Fig. 23, corresponding in function with the respective wires 186, and 313, shown in Fig. 2. Similarly there is an electrode 116, in circuit with the electric valve for each of the other departmental chambers 32, 84, 62 and 63 (Fig. 15).

In a similar manner, for each controlled coupler there is a controlling rocker 112, contacting with an electrode 116, which closes a circuit which admits air to the coupler chamber.

Each of the several controlling rockers 112, is adapted to coöperate with all of the traces, each trace having a pin $i$, for each rocker. When a trace moves outward (to the left in Figs. 11 and 13) its depressed pins $i$, will encounter the lower arms $l$, of the neighboring rockers 112, thereby rocking them so as to contact with their respective electrodes 116, thereby bringing into action the several departments, stops, and couplers controlled thereby. By arranging the pins $i$, differently on the several traces various different combinations can be produced. For example, as there are twelve traces (in the specific organ illustrated) which coöperate with the tracker, twelve different combinations of stops, departments and couplers can be automatically brought into use during the playing of a single musical composition. This suffices for compositions of great elaboration. By increasing the number of holes in the tracker assigned for this purpose, the range of combinations can be increased. These stop combinations can be varied by adjusting the pins, and this can be done by the owner. In practice, however, the music is cut with reference to particular effects which are desired to carry out the conception of the composer, and the pins $i$, of the different traces are set by the manufacturer to correspond with the cutting of the music; and, in such event, the pins may be fixed in place so as not to be adjustable.

As a specific illustration of the setting of the pins reference will be made to the four controlling rockers 112, and their electrodes which coöperate with the four departmental chambers 31, 32, 62 and 63. There are three usual ways in which the swell and great departments are combined. The normal arrangement is to play the swell organ from the upper tracker holes and the great organ from the lower tracker holes. In this case, the chambers 32, and 62, are exhausted, and certain of the traces, as desired, have their corresponding pins $i$, depressed, so as to rock the appropriate traces, when said traces are moved outward. The reverse arrangement is for the upper tracker holes to play the great organ and for the lower holes to play the swell organ, in which case the chambers 31 and 63, are exhausted, by the movement of their co-acting rockers 112, through the depressed pins of other traces. Finally, all four chambers 31, 32, 62 and 63, may be exhausted through depressed pins of still other traces, so that both sets of tracker holes will play both departments.

When a trace is moved outwardly its depressed pins $i$, swing the lower arms $l$, of the rockers 112, which they encounter, thereby bringing the crank arms $o$, of such rockers into active position in contact with the respective electrodes 116. When the trace then moves inwardly (to the right in Figs. 11 and 13) it leaves the rockers just acted upon by depressed pins in active position. That is to say, a single trace can never restore to normal idle position those rockers 112, which it moves to active position. To restore such active rockers requires the outward movement of another trace having its pins raised which correspond with the depressed pins of the first acting trace. For example, if in Fig. 13, the trace 110, moves outwardly its depressed pin $i$, will encounter the lower bar of the rocker 111, at the left and tilt that rocker so as to incline it in the opposite direction. The trace 110, can then move back again without affecting the tilted rocker. But, if any other of the traces has its pin elevated which is in the same transverse row as the depressed pin of trace 110, then when that trace is moved outwardly (to the left in Fig. 13) its said elevated pin encounters the upper bar of the tilted rocker and swings it back to the normal position shown in Fig. 13. In other words it is only on the outward movement that any trace through its pins tilts rockers whether the pins are up or down. This one way action of a trace is important because it enables a trace to be immediately restored to its normal inner position after it has done its work leaving the rockers affected by it in their active positions. As is apparent, any trace moved outwardly will by its raised pins restore to idle positions any of the rockers 112, which do not belong to its own combination.

The restoration trace 124 (Fig. 11) has raised pins $i$, only, so that whenever it is moved outwardly it restores to initial position any rockers 111, or 112, which may be tilted with their upper arms to the right (Fig. 13) of their lower arms, thus cutting out and rendering idle all of the stops, departments, and controlled couplers.

The six trace selecting rockers 111, do not control any stops, etc., but their function is to determine which of the two traces coöperating with a single hole in the tracker shall be brought into action.

*Trace actuation.*—Each trace at its inner end has pivoted to it a selector 125. Normally, all of the selectors occupy the full line position of Fig. 13, where they are out of the reach of an actuator 126, which is common to them all, as shown in Fig. 11. The actuator is carried by levers 127, which are pivoted near their upper ends and are connected at their lower ends by adjustable rods 128, with the movable board of a bellows 129. The interior of the bellows communicates by port 130, with an air supply chamber 131, containing air under pressure, and with the atmosphere by port 132. A valve 133, coacts with port 130, and a valve 134, coacts with port 132. Both valves are connected to a pneumatic 135, the interior of which communicates by passage 136, with an electric valve J. Normally, the valve J, is closed; the bellows 129, and the pneumatic 136, are vented; and the actuator 126, occupies the idle position shown in Fig. 13. When, however, the solenoid of valve J, of Fig. 13, is energized said valve is lifted, and air flows from chamber 131, through pipe 137, (Fig. 12), passages 138 and 136 (Fig. 13), to pneumatic 135, which lifts whereupon valve 134 is closed and valve 133, is opened so that air flows into and expands bellows 129, and actuator 126, moves to the left. The solenoid of valve J, shown in Fig. 13, is energized whenever an aperture in the note sheet registers with one of the holes 101, 102, 103, 104, 105, 106, or 109, in the tracker; and also when one of the hand governed switches (hereinafter described) is manipulated which co-acts with one of the six traces at the right in Fig. 14, and of which one, 139, is shown at the top of Fig. 11. Hence, whenever any trace is to be brought into action, the actuator 126, as shown in Fig. 13, is moved to the left.

That trace is moved by the actuator, depending upon which selector 125, is lifted into the path of the actuator. Each selector is connected by a rod 150 (Fig. 13), with the core 151, of a solenoid 152, of which there are nineteen as shown in Fig. 12. For example, the magnet 1561, for the selector 125, of restoration trace 124, is in circuit through wire 221 (Fig. 2), with the pneumatic K, which is governed by the hole 109, in the tracker. Hence, whenever an aperture in the note sheet registers with hole 109, said pneumatic K, is lifted and makes electrical connection with the generator 300, through wire 301 (Fig. 2) and bus-bar 29, of tube bar O, and the circuit through magnet 1561, is completed through wires 322, 316, and 162, leading to the generator. As will be explained the result is to energize the corresponding solenoid 152, and the selector of trace 124, is lifted into the path of actuator 126. Concurrently the bellows-controlled electric valve is lifted, but the momentary delay due to time required for the air to flow from chamber 131, through pipe 137, and passages 138 and 136, to the pneumatic 135, permits the selector to move into the path of the shoulder 153, on the actuator 126, before the actuator moves. Hence, when the actuator does move it acts on the raised selector 125, and moves the trace 124, outwardly. When the circuit is broken which leads to the valve J, of Fig. 13, the passage 136 is vented, pneumatic 135 collapses, valve 133 closes, valves 134 opens, bellows 129 is vented, and springs 154 (Fig. 12) collapse the bellows and restore actuator 126 to its idle position, shown in Fig. 13. Thereupon a spring 155 (Figs. 11 and 13) restores trace 124 to its normal inner position.

The coöperation of the twelve traces governed by the six holes 101 to 106 in the tracker is dependent upon the positions of the rockers 111. These twelve traces are grouped in pairs and it will facilitate explanation to consider a single pair, and for this purpose the traces 110 and 1101, will be considered. The selectors 125, of these traces co-act respectively with the solenoids 1521, and 1522, shown in Fig. 12. Now, both of these traces are controlled by the same hole 101, in the tracker. The pneumatic K, governed by that hole, closes a circuit, which includes a wire 227 (Fig. 2) and the magnet 156, at the bottom of Fig. 12, the circuit being completed from the generator through wire 317 (Fig. 2) and wire 319, to button 203, by electrode 205 (Fig. 18) thence by electrode 206, and wires 209, 220, and 219, (Fig. 2) to feed-bar 213, and from magnet 156, by wires 316, and 162, back to generator. This magnet 156 has two elastic spring contacts 157 and 158, above each of which is an attached armature 159 (Fig. 13).

The spring contact 157, is permanently connected with a bus-bar 160, which in turn is in circuit with the solenoid of the valve J, of Fig. 13, which controls bellows 129, through the metallic base of said solenoid. When the magnet 156, is energized the spring 157 is drawn down and makes contact with a bus-bar 161, which is in communication by wire 162 (Fig. 12), with the generator 300, as shown in Fig. 13, the opposite pole of the generator being connected to the solenoid of the bellows electric valve J, by wire 325. Thus, when magnet 156, is energized a local circuit is closed which includes the solenoid governing the bellows 129, and the trace actuator does its work.

Also, when the magnet 156, is energized the second spring 158, is drawn down also making contact with the bus-bar 161. This spring electrode 158, is connected by wire 163 (Fig. 2), with the electrode 113, which is in permanent electric contact with the rocker 111, which co-acts with the two traces 110 and 1101. A circuit is then closed from generator 300, by wire 162, (Fig. 2) to feed-bar 161; thence by electrode 158, and wire 163, and electrode 113, to rocker 111, thence through that rocker to its lower electrode 114, and thence by wire 168, to the solenoid 1521, and thence by the metal base 165 (Fig. 12), of the solenoid to bus-bar 166, which is connected by wire 167, and wire 312 back to the generator.

Hence, when an aperture in the note sheet registers with hole 101, the circuit is closed which includes the solenoid 1521, whereupon the selector 125, of trace 110, is lifted into the path of actuator 126, and that trace is moved outwardly, thus setting up the stop combination controlled by it. When the note sheet aperture passes the hole 101, in the tracker, the circuit is broken, and trace 110, resumes its normal inward position leaving its stop combination set up.

When the trace 110, is moved outwardly, one of its depressed pins $i$, encounters and swings the co-acting trace selecting rocker 111 (Fig. 14), thereby moving its crank arm $o$, out of contact with the lower electrode 114, and bringing it into contact with the upper electrode 115, which is in permanent electric connection with the solenoid 1522 (Fig. 12), appurtenant to the trace 1101, through wire 164. This can only occur as the actuator 126, is completing its effective stroke. At this time the selector 125, of trace 110, cannot drop and become disconnected from the actuator because of the beveled coacting end of the selector and the pressure on it due to the spring 155; and the selector of trace 1101, cannot be effectively engaged by the actuator because in rising it is stopped by coming in contact with the lower face of the actuator.

When the aperture in the note sheet passes the tracker hole 101, and the actuator 126, resumes its normal position, the selectors 125, of both traces 110 and 1101, resume their low positions, trace 110, is restored to normal position, and the co-acting rocker 111, is left with its crank arm $o$, engaging the upper electrode 115, and in electric connection with the solenoid 1522.

Should it then be desired to bring into action the stop combination controlled by trace 1101, a second aperture at the appropriate place in the note sheet registers with tracker hole 101, and again magnet 156 (at the bottom of Fig. 12) is energized, and the circuit which includes the armature 158, is closed; but this time the circuit leads from the corresponding electrode 113, through its rocker 111, to the upper electrode 115 (Fig. 14), and thence to solenoid 1522. Thereupon, the selector 125, of trace 1101, is lifted into the path of actuator 126, and that trace is moved outwardly thus setting up its stop combination. At the same time, a raised pin $i$, on the trace 1101, encounters the upper rod $m$, of the coacting rocker 111, thereby swinging so that its crank arm $o$, breaks contact with electrode 115, and resumes its original position in contact with electrode 114. When the tracker hole 101, is again covered, trace 1101, is moved to its normal position by its spring 155, and the stop combination controlled by it remains set up. Thus, the coacting rocker 111, acts to bring the traces 110 and 1101, alternately in action.

The restoration trace 124, has a lifted pin $i$, coöperating with the rocker 111, which coacts with the traces 110 and 1101, so that, at the completion of a composition, said rocker 111, is left in its normal position with its crank arm $o$, in contact with electrode 114, and the trace 110, ready for action. Should it be desired to commence playing a composition with the stop combination of trace 1101, two apertures in the note sheet would register with the tracker hole 101, one immediately after the other, before the first music apertures reached the music holes 99 or 100, of the tracker.

In just the same way the remaining ten traces (at the left in Fig. 14) are arranged in pairs, the five pairs being controlled by the five tracker holes 102, 103, 104, 105, and 106, respectively, there being five additional rockers 111, one for each pair of traces.

Each of the initially acting traces of each of the six pairs of note sheet controlled stop combinations has an upstanding pin coöperating with the upper rod $m$, of each of the five rockers not belonging to its own pair; so that whenever one such trace is moved outwardly it will act to reset to normal position any rocker 111, not belonging to its own pair which has its crank arm $o$, in contact with an upper electrode. For example, traces 1102 and 1103 (Figs. 11 and 14), constitute a second pair controlled by tracker hole 102. If now trace 110, had previously acted, leaving its rocker 111, positioned to contact with an upper electrode 115, and tracker hole 102, is exposed by a note sheet aperture, the trace 1102, will move outwardly and its coacting raised pin $i$, will restore the rocker 111, of trace 110, to its original position with its crank arm $o$, engaging its lower electrode 114.

Hence, either at the start of a composition, or at any time during the playing, if the second trace of a pair is to be brought into action, the first trace must act in advance. That is to say, the corresponding tracker hole must be exposed twice in succession by similarly located apertures in the note sheet.

The restoration trace 124, has elevated pins $i$, for each of the six rockers 111, so that any one left tilted at the close of a composition is restored to its normal position with its crank arm $o$, in contact with its lower electrode 114. The restoration hole 109, in the tracker controls a circuit similar to that controlled by one of the holes 101 to 106, excepting that it does not extend through a rocker. That is to say, the electrode 158, governed by magnet 1561 (Fig. 2), is permanently in circuit by wire 169, with the solenoid 1523, which governs the selector of the trace 124.

Hence when the restoration magnet 156, is energized by the uncovering of the restoration or re-roll hole, (as already explained), a circuit is closed including generator 300, wire 102, feed-bar 161 (Fig. 2), electrode 158, wire 169, solenoid 1523, bus-bar 166, and wires 167, and 312, back to the generator. Hence the restoration trace 124, is actuated to restore all of the rockers to their normal positions with all of the stops, couplers, and departments out of commission.

*Stop combination selecting mechanism (hand controlled).*—In addition to the six magnets 156 for the six tracker holes 101 to 106, and the magnet 1561 for the restoration hole 109; and in addition to the twelve solenoids 152 for the twelve music sheet controlled stop combination traces, and the solenoid 1523 for the restoration trace; there are six magnets 1562, and six solenoids 1524, one of each for each of the six hand governed stop combination traces 139 shown at the right in Fig. 14. The spring electrode 158 of each of the magnets 1562 is directly connected with its solenoid 1524 by a wire 1691, as shown in Fig. 2.

As shown in Fig. 17, there are six push knobs 170, at the front of the console at one side of the manuals, one for each of the traces 139. As shown in Fig. 18, each knob 170, is held in off position by a spring 171. The push knob carries a metal plunger 172. When the knob 170, is pushed in, the plunger 172, contacts with two separated spring electrodes 173, 174, thus closing an electric circuit which includes them. This circuit, as shown in Fig. 2, includes generator 300, wire 317, wire 321, (Fig. 2), plunger 172, springs 173, 174 (Fig. 18), wire 210, the combination switch 180, hereinafter described, and the wire 211, which leads to one of the magnets 1562 (Figs. 2 and 12), and thence by wires 318, 316, and 162, back to the generator. This closes the circuit which includes the generator, wire 162, busbar 161, electrode 158, wire 1691, solenoid 1524, bus-bar 166, and wires 167, and 312, and, when the circuit is closed, the corresponding trace 139, thereupon moves outwardly setting up its combination. On releasing a knob 170, its spring 171, moves it outwardly, and the circuit is broken at 173, 174. The corresponding trace 139, resumes its normal position but its stop combination remains set up.

By increasing the number of traces 139, and knobs 170, more combinations can be controlled by hand. Six of each suffices in practice, because additional stops can be set individually by hand by manipulation of the corresponding usual stop keys.

The organ is adapted to be played by ordinary note sheets on the market which have no apertures corresponding with the holes 101 to 109, through the employment of the adjustable note sheet and take up support set forth in Letters Patent of the United States No. 1,250,165, December 18, 1917. When using such note sheet the stop combination knobs 170, can be employed. On referring to Fig. 21, it will be noted that the restoration hole 109, is the inner extra hole at its side (right) of the tracker. It is covered by the narrower sheet (not having apertures to coöperate with holes 101 to 109) during the playing of a composition. The narrower note sheet is cut with a notch at the right edge beyond the termination of the music holes. When, therefore, the composition has been played, the hole 109, will be uncovered by the notch in the sheet, and the consequent action of the restoration trace 124, restores to normal position the last active hand governed stop combination trace 139. The outward movement of any of the other eighteen traces serves to restore the restoration trace 124, to its normal inward position. The hand controlled traces 139, have no pins acting upon the six trace selecting rockers 111.

In Fig. 12, only a portion of the electrodes 157 and 158, are shown. There is a pair of these electrodes for each of the thirteen electro-magnets indicated. As shown in Fig. 13, these electrodes are inclosed in a protecting box, and adjustable stops are provided to limit the upward movement of the electrodes. Figs. 11, 13 and 14, illustrate a well known arrangement of traces and rockers which does not in itself constitute a portion of the present invention except in so far as the rockers are utilized as electric conductors and switches and are included in combination with the characteristic features of the invention. Instead of the illustrated arrangement of rockers and traces being employed, the equivalent rocker and trace construction set forth in the United States Letters Patent of Robjohn No. 93,349, August 3, 1869, may be employed. If the Robjohn construction should be employed, each rock shaft would be utilized as an electric conductor and would be cranked at at least one end so as to act as a switch.

*Hand control cut-out.*—The organ can be played and controlled entirely by hand. When it is played automatically from the wider sheet it is desirable that the hand controlled stop keys, coupler keys, departmental switches, and shade control switches, should be rendered inoperative so that there can be no accidental or intentional interference with the automatical control from the note sheet. To this end a gang switch 180, is employed, which is indicated in Figs. 1 and 2, and is shown in detail in Figs. 19, and 20. All wires from the electrodes 113, (Fig. 2) of the stop combination mechanism are joined in a cable 181, which leads to a switch board 182. Each individual wire 183 (Figs. 19 and 20) of the cable 181, is connected with a separate contact plate 184, on the switch board. An outgoing wire 185, leads from each plate 184, and these wires unite in a cable 186, which leads to the organ, and to the several electric valves J, thereof which control the stops, couplers, and departments. A single wire of this cable 186, is shown in Fig. 2. Hence, these circuits are not affected by the gang switch 180; that being unnecessary, because, when the organ is played by hand no air under pressure is admitted to the tracker box, and hence there can be no conflicting automatic playing or control.

All the wires from the console which lead from manually governed keys, levers, or switches for controlling stops, couplers, departments, swell shades, and the like, are united in a cable 187 (Figs. 1, 19 and 20), which leads to the gang switch 180. Each wire 188, of this cable connects with a separate spring finger 189, attached to the switch 180. There is one of these fingers 189, for each contact plate 184, and adapted to contact therewith.

The switch 180, is mounted to swing on the axis 190, so as to move the fingers 189, into and out of contact with the respective plates 184. The switch 180, has crank arms 191, connected by links 192, with the movable board of a bellows 193. The interior of the bellows communicates by passage 194 and port 195, with a supply box 196, containing air under pressure. It also communicates by port 197, with the atmosphere. Two valves 198 and 199, are connected to a pneumatic 200. When the pneumatic 200, is expanded, as shown in Fig. 20, the valve 198, is closed, the valve 199, is opened, and the passage 194, is vented. Hence, the bellows 193, is collapsed by gravity and the switch 180, is opened. The interior of pneumatic 200, communicates by passage 201, with electric valve J; and that valve communicates by conductor 202, with the supply box 196. When valve J, is lifted owing to the energizing of its solenoid, air flows from supply box 196, through passages 202, and 201, to the pneumatic 200, thereby expanding it; and the switch 180, is maintained open. When valve J, is down, pneumatic 200, is collapsed, valve 199, closes, and valve 198 opens, whereupon air flows from chamber 196 to bellows 193 which expands, thus closing the gang switch 180, each finger 189, then contacting with the registering plate 184. Normally the switch is closed so that the organ can be controlled by hand.

When the organ is to be played automatically, the switch 180, is opened; and this is done by energizing the solenoid of the valve J, of Fig. 20. For this purpose, the console has a push button 203 (Figs. 17 and 18), which normally stands out as shown in Fig. 18. It carries a switch 204, which is always in contact with a spring electrode 205, but is normally out of contact with a spring electrode 206. When the button 203, is pushed in the switch 204, contacts with both electrodes 205 and 206, thereby closing the circuit of which they are terminals. This circuit includes the generator 300, wire 317, wire 319 (Fig. 2), electrode 205 (Fig. 18), switch 204, of button 203, electrode 206, wire 209 (Fig. 2), and the solenoid of the valve J, shown in Fig. 20, from which wires 320, and 162 (Fig. 2) return to the generator. Hence, when the button 203, is pushed in, the valve J, lifts and the gang switch 180, is opened.

The switch 180, can be closed at any time by pushing in the button 207, which is connected with button 203, by lever 208, so that one bar moves out when the other moves in. When the gang switch 180, is closed, the circuits which govern the stops, departments and the like, are then controlled by hand in the same way as they are controlled by the extra holes in the tracker when the gang switch is open. As a specific example, there is illustrated in Fig. 1, a stop key 212, which is shown as swung so as to close the electric circuit which includes the connections 301, and 307, from the generator and the illustrated wire of the cable 187. This wire leads to the gang switch 180, and to one of the fingers 189, thereof which may be assumed to be the lowermost finger illustrated in Fig. 2. If the gang switch 180, is closed this finger 189, makes electric contact with the registering plate 184, from which extends the wire of the cable 186 (shown in Fig. 2), which leads to the solenoid of the electric valve J, which controls the illustrated supply box 96, of the stop chamber 52.

When the gang switch 180, is open the same supply box 96, is under the control of the extra holes 101 to 106, in the tracker through the stop selecting mechanism. As shown in Fig. 2, when the controlling rocker 112, is rocked to active position, a circuit is completed (as already explained) which includes the wire of the cable 181, and that wire leads to the lowermost plate 184, and from that plate the illustrated wire of the cable 186, leads to the solenoid of the valve J, of the same supply box 96.

*Starting and stopping.*—To use the automatic playing instrumentalities controlled by the extra holes 101 to 108, of the tracker, the push button 203 (Figs. 17 and 18), is pushed in thereby establishing electrical communication between the electrodes 205 and 206, and hence closing the circuit which includes the wire 209, leading to the solenoid of the electric valve J, shown in Fig. 20, and thereby opening the gang switch. At the same time, the bus-bars or feed bars which coöperate with the pneumatics K, which are governed by the extra holes 101 to 108, of the tracker are rendered active. As shown in Fig. 2, the hole 109, of the tracker G, communicates by its tube 26, with a pneumatic K, which coöperates with the same bus-bar or feed bar 29, which coöperates with all of the pneumatics of the tube bar O, which are governed by the lower row of tracker holes 100. In all other cases, however, the pneumatics which are controlled by the extra holes 101 to 108, of the tracker coöperate with feed bars which are independent of the feed bars 29, of the two tube bars N and O, which coöperate with the note holes of the tracker. As shown in Fig. 2, there are two feed bars 213 and 214, at opposite ends of the bus-bar 29, of the tube bar N, and they are permanently connected by the wire 215. These feed bars 213 and 214, coöperate with the pneumatics K, which are governed by the extra holes 101, 103, 105, 106 and 108 (Fig. 21), of the upper row of holes in the tracker. Fig. 2, shows one of the tubes 25, which leads from the hole 101, to the corresponding pneumatic K. Similarly, as shown in Fig. 2, there are two feed bars 216 and 217, at opposite ends of the bus-bar 29, of the tube bar O, and these feed bars are permanently connected by the wire 218. These feed bars 216 and 217, coöperate with the pneumatics which are controlled by the extra holes 102, 104 and 107 (Fig. 21), of the lower row of tracker holes. These additional feed bars are connected by wires 219 and 220 (Fig. 2), with the wire 209, which is part of the circuit governed by the push button 203. Accordingly, when the organ is played by hand or by a narrow note sheet and the push button 203, is in its outer position shown in Fig. 18, the feed bars 213, 214, 216 and 217, are cut out and are not in electrical connection with the electric battery, and hence the automatic control of the stops, departments, etc., is cut out. When, however, automatic playing is to be done, and the push button 203, is pushed in, the feed bars, 213, 214, 216 and 217, are put into communication with the electric battery and are thereby rendered active and are ready to coöperate with the corresponding pneumatics K.

It is obvious that the particular arrangement of the several feed bars 213, 214, 216 and 217, is merely incidental to the particular location of the pneumatics K, governed by the extra holes 101 to 108, on the tube bars N and O. All of these pneumatics K, coöperating with these extra holes might be placed on a separate tube bar in which event a single feed bar could be used in place of the illustrated feed bars 213, 214, 216 and 217.

As already stated the hole 109, in the tracker communicates through its tube 26 (Fig. 2), with a pneumatic K, coöperating with the regular bus-bar 29, of the tube bar O, so that its action is not affected by the push button 203. Consequently, the rockers 111 and 112, can be put in their normal positions whether wide note sheets are employed with holes controlling the extra holes 101 to 109, of the tracker or whether narrower note sheets are employed which do not coöperate with the said tracker holes. When the wide note sheet is employed, at the close of a composition a special aperture in the note sheet uncovers the tracker hole 109, thereby lifting the corresponding pneumatic K (Fig. 2), and hence through the bus-bar 29, closing an electric circuit which includes the wire 221, which leads to the magnet 1561, which controls the restoration or zero trace 124, thereby restoring all of the rockers to normal position as heretofore explained.

When a narrow note sheet is employed the push button 203, is not pushed in and consequently all of the extra holes 101 to 108, are idle and nothing happens as the result of their being constantly exposed. The narrow sheet, however, does close the hole 109, during the playing of the composition. At the close of the composition the narrow sheet has a notch in the corresponding edge, which uncovers the hole 109, which accordingly acts to restore all of the rockers of the stop selecting mechanism to normal position in just the same way as when the wide note sheet is employed.

As heretofore stated the six traces 139, can be controlled by the push buttons 170, either when playing the organ by hand or when the narrow note sheet is employed. When the organ is played by hand, it is important that any of the rockers controlled by these traces which may have been in use should be restored to idle position, and this is accomplished by the devices particularly shown in Fig. 25, and as indicated in Figs. 2 and 17. Fig. 17, illustrates the eight push buttons which are specifically set forth and described in United States Letters Patent No. 1,230,895, June 26, 1917. As explained in that patent, when the "zero" push button 222, is pushed in all of the circuits under the control of the disclosed mechanism are opened and the result in the organ now illustrated is that the chambers of the departmental chest P, are rendered idle. This same zero push button 222, is now additionally used for the purpose of restoring the rockers rendered active by the hand governed traces 139, to their normal idle positions. As shown in Fig. 25, (which corresponds with Fig. 5, of said Patent No. 1,230,895, and hence showing the upper button thereof) the inner padded end of the push button 222, is in line with the inner end of a sliding pin 223, which at its outer end adjoins a spring electrode 224. Normally, this spring electrode 224, is out of contact with an electrode 225, as shown in Fig. 25. These two electrodes constitute terminals of an electric circuit. When, however, the push button 222, is pushed inwardly for the purpose of rendering the department-selecting chambers idle, the sliding pin 223, is pushed upon and the spring electrode 224, contacts with electrode 225, thereby closing the circuit. This circuit includes the generator 300 (Fig. 2), wire 317, wire 321 (Fig. 25), terminals 224 and 225, a wire 226, shown in Fig. 2, which joins the wire 221, leading to the magnet 1561, which controls the restoration or zero trace 124 (Fig. 11), and from that magnet by return wires 322, 316, and 162 (Fig. 2) to the generator. Consequently, when the push button 222, is pushed inwardly by hand any rockers 112, rendered active by a combination trace 139 (Fig. 11), are restored to their idle position. Fig. 25 not only shows the push button 222 which is utilized to control the circuit having the terminals 224 and 225, but it also shows a companion and connected push button 422, which is the push button shown in Fig. 17 as bearing the symbol "Great acc." These two push buttons correspond to the push buttons H and D, respectively, of said Patent No. 1,230,895, in which their relation is fully set forth. As stated in that patent the upper push button shown at 422 in Fig. 25 of the present case is utilized to control the "great" department of the organ, and the lower push button shown at 222 in the present case, when pushed in, is utilized to restore the upper push button 422 to its normal forward idle position.

Mechanism for rerolling the note sheet after the playing of a composition has been finished, for stopping the note-sheet-driving mechanism, and for cutting off the supply of air to the tracker box is set forth in United States Letters Patent No. 1,304,971, dated May 27, 1919.

When using the wide note sheet, the user need not utilize the automatic selecting mechanism, but may manipulate the stops himself so as to suit his own interpretation of the composition. If the user desires to do so, he would not press the starting switch 203, and the action of the organ would then be just the same as though the narrower sheet was employed.

To facilitate the attachment of a wire to one of the solenoids, it is equipped with an elastic connector Z. As shown in Fig. 26, the connector Z, is a piece of wire bent to constitute a loop $s$, and two elastic arms $t$ and $w$. The arm $t$, has a hook $x$, near its free end. The solenoid winding is in electric contact with the loop $s$, (preferably by soldering) and the loop is secured to the solenoid by a strip of adhesive tape $y$, as shown in Figs. 3 and 22. The corresponding wire $u$ (Fig. 22), has a ring $z$, at its end which embraces both arms $t$ and $w$, and engages the hook $x$. In order to engage the ring, the two arms $t$ and $w$, are pressed toward each other and the ring is put in place. The arms then spring apart as far as the ring permits, thereby securely holding the ring in place, and they bear upon the ring with elastic force so as to insure the maintenance of a good electrical connection. The wires can be conveniently attached and detached.

The solenoids which are employed are a preferred type of electro-magnets. Other forms of electro-magnets may be employed.

I claim—

1. A note sheet played organ having a tracker; pneumato electric actions communicating respectively with holes in the tracker; stop wind chambers; an electric valve controlling each stop chamber; a departmental selecting mechanism having a plurality of chambers; an electric valve controlling each departmental chamber; coupler chambers; an electric valve controlling each coupler chamber, and electric circuits including said electric devices respectively; in combination with stop, department and coupler selecting mechanism comprising a plurality of traces and of controlling and trace selecting rockers, each controlling rocker constituting an electric conductor and acting as a switch to make and break one of said electric circuits, two additional electric circuits for each trace selecting rocker, each trace selecting rocker constituting an electric conductor and serving as a double acting switch to make and break its two electric circuits alternately, but always when at rest closing one of said circuits; a movable selector for each trace; an actuator common to all of the traces; a solenoid connected with each selector and adapted to move it into the path of the actuator, the solenoids being in pairs, and the solenoids of each pair being respectively in the two electric circuits governed by one of said trace selecting rockers; a pneumatic motor connected with the actuator to move it; an electric valve controlling said motor; an electric circuit including said valve; a plurality of electro-magnets, each electrically connected with and controlled by one of the said pneumato electric actions; and two circuit closing contacts governed by each of said magnets, one of said contacts controlling the circuit of the electric valve for said pneumatic motor, and the other contact controlling the circuit which includes one of said trace selecting rockers.

2. A note-sheet played organ having a tracker; pneumato electric actions communicating respectively with holes in the tracker; electric valves controlling departments, stops, and couplers; and electric circuits for said electric devices respectively; in combination with a selecting mechanism comprising a plurality of traces and of controlling and trace selecting rockers; each controlling rocker acting as a switch to make and break one of the electric circuits; two additional electric circuits for each trace selecting rocker, each trace selecting rocker serving as a double acting switch to make and break its two electric circuits alternately, but always when at rest closing one of said circuits; a movable selector for each trace; an actuator common to all of the traces; a solenoid connected with and arranged to move each selector into the path of the actuator, the solenoids being in pairs, and the solenoids of each pair being respectively in the two electric circuits governed by one of said trace selecting rockers; means for moving the actuators; a plurality of electro-magnets, each in one of the circuits with and controlled by one of the said pneumato electric actions and a contact governed by each of said magnets and controlling the circuit leading to one of said trace selecting rockers.

3. A note-sheet played organ having a tracker; pneumato electric actions communicating respectively with holes in the tracker, and electric circuits therefor respectively; in combination with selecting mechanism for stops and the like comprising a plurality of traces and of controlling and trace selecting rockers; each controlling rocker acting to govern a stop or other organ instrumentality; two additional electric circuits for each trace selecting rocker, each trace selecting rocker serving as a double acting switch to make and break its two electric circuits alternately, but always when at rest closing one of said circuits; a movable selector for each trace; an actuator common to all of the traces; a solenoid connected with and arranged to move each selector into the path of the actuator, the solenoids being in pairs, and the solenoids of each pair being respectively in the two electric circuits governed by one of said trace selecting rockers; means for moving the actuators; a plurality of electro-magnets each in one of the circuits with and controlled by one of the said pneumato electric actions; and a contact governed by each of said magnets and controlling the circuit leading to one of said trace selecting rockers.

4. A note-sheet played organ having a tracker; pneumatics communicating therewith; electric circuits controlled by the tracker; variable pressure chambers; an electric valve controlling each chamber; and an electric circuit including each electric valve; in combination with selecting mechanism for said chambers comprising a plurality of traces and of controlling and trace selecting rockers actuated by said traces; each controlling rocker constituting a switch to make and break one of the electric circuits; two additional electric circuits for each trace selecting rocker, each trace-selecting rocker constituting a double acting switch to make and break its two electric circuits alternately; a movable selector for each trace; an actuator common to all of the traces; a solenoid connected with and arranged to move each selector into the path of the actuator, the solenoids being in pairs, and the solenoids of each pair being respectively in the two electric circuits governed by one of said trace-selecting rockers; means for moving the actuator; a plurality of electro-magnets, each in one of the circuits controlled by one of said pneumatics; and a contact governed by each of said magnets and controlling the circuit leading to one of said trace-selecting rockers.

5. A note-sheet controlled organ having a tracker; pneumatics communicating therewith; electric circuits controlled by said pneumatics; variable pressure chambers; an electric valve controlling each chamber; and an electric circuit including each electric valve; in combination with a chamber selecting mechanism comprising a plurality of traces and of controlling rockers actuated by said traces; each controlling rocker constituting an electric conductor and acting as a switch to make and break an electric circuit, including the controlling electric valve for one of said chambers; a movable selector for each trace; an actuator common to all of the traces; a solenoid connected with and arranged to move each selector into the path of the actuator; a pneumatic motor connected with the actuator to move it; an electric valve controlling said motor; an electric circuit including said electric valve; a plurality of electro-magnets, each in the circuit controlled by one of said pneumatics; and two contacts governed by each of said magnets; one of said contacts controlling the circuit of the electric valve for said pneumatic motor, and the other contact being in circuit with one of said solenoids.

6. An organ having a tracker; pneumatics communicating therewith; electric circuits governed by said pneumatics; variable pressure chambers; an electric valve controlling each chamber; and the electric circuit including such electric valve; in combination with a chamber selecting mechanism comprising a plurality of traces and of controlling rockers actuated by said traces; each controlling rocker constituting a switch to make and break an electric circuit including the controlling electric valve for one of said chambers; a movable selector for each trace; an actuator common to all of the traces; electric means controlled by one of said pneumatics connected with and arranged to move each selector into the path of the actuator; and means for moving the actuator.

7. An organ having a tracker; pneumato electric actions communicating respectively with holes in the tracker; variable pressure chambers; and a valve controlling each chamber; in combination with chamber selecting mechanism comprising a plurality of traces and of controlling and trace selecting rockers; each controlling rocker acting to move one of said valves; two additional electric circuits for each trace-selecting rocker, each trace selecting rocker constituting an electric conductor and serving as a double acting switch to make and break its two electric circuits alternately, but always when at rest closing one of said circuits; a movable selector for each trace; an actuator common to all of the traces for each selector; a solenoid connected therewith and arranged to move each selector into the path of the actuator, the solenoids being in pairs, and the solenoids of each pair being respectively in the two electric circuits governed by one of said trace selecting rockers; a pneumatic motor connected with the actuator to move it; an electric valve controlling said motor; an electric circuit including said electric valve; a plurality of electro-magnets, each electrically connected with and controlled by one of the said pneumatic contacts; and two contacts governed by each of said magnets, one of said contacts controlling the circuit of the electric valve for said pneumatic motor, and the contacts being in circuit with one of said trace selecting rockers.

8. An organ having a tracker; electric circuits governed thereby; variable pressure chambers; and a valve controlling each chamber; in combination with chamber selecting mechanism comprising a plurality of traces and of controlling and trace-selecting rockers; each controlling rocker acting to move one of said valves; two additional electric circuits for each trace selecting rocker, each trace selecting rocker serving as a double acting switch to make and break its two electric circuits alternately; a movable selector for each trace; an actuator common to the traces; a solenoid connected with and arranged to move each selector into the path of the actuator, the solenoids being in pairs, and the solenoids of each pair being respectively in the two electric circuits governed by one of said trace selecting rockers; means for moving the actuator; a plurality of electro-magnets, each controlled by one of the tracker governed circuits; and a contact governed by each of said magnets in a circuit leading to one of said trace selecting rockers.

9. An organ having a tracker; variable pressure chambers; and a valve controlling each chamber; in combination with chamber selecting mechanism comprising a plurality of traces and of controlling and trace selecting rockers; each controlling rocker acting to move one of said valves; two additional electric circuits for each trace selecting rocker, each trace selecting rocker constituting a double acting switch to make and break its two electric circuits alternately; means for selectively moving the traces controlled by the trace selecting rockers and through the tracker.

10. An organ having, in combination, a trace selecting rocker constituting a double acting switch controlling two electric circuits, but always when at rest closing one of said circuits; two traces coöperating with said rocker; a selector pivoted to each trace and having its free end beveled; two solenoids, one for each selector and acting to lift it; an electric circuit for each solenoid controlled by said rocker; an actuator for both selectors, having a shoulder to engage the beveled end of the lifted selector, and on its actuating movement passing above the normally depressed selector, thereby acting as a stop to prevent the lifting of such depressed selector; and means for moving said actuator.

11. An organ having, in combination, a trace selecting rocker constituting a double acting switch controlling two electric circuits, but always when at rest closing one of said circuits; two traces coöperating with said rocker; a selector pivoted to each trace; two solenoids, one for each selector and acting to move it into active position; an electric circuit for each solenoid controlled by said rocker; an actuator for both selectors, having a shoulder to engage the beveled end of the active selector, and on its actuating movement crossing the path of the idle selector, thereby acting as a stop to prevent the movement of such idle selector; and means for moving said actuator.

12. An organ having, in combination, a trace selecting rocker constituting a double acting switch controlling two electric circuits, but always when at rest closing one of said circuits; two traces coöperating with said rocker; a selector connected with each trace; two solenoids, one for each selector and acting to move it into active position; an electric circuit for each solenoid controlled by said rocker; an actuator for both selectors adapted to engage the active selector, and on its actuating movement passing across the path of the idle selector, thereby acting as a stop to prevent the movement of such idle selector; and means for moving said actuator.

13. An organ having, in combination, a trace selecting rocker constituting a double acting switch controlling two electric circuits; two traces coöperating with said rocker; a selector for each trace; separate electric means for moving each selector independently into active position; an electric circuit controlled by said rocker for each of said separate electric means; an actuator for both selectors adapted to engage the active selector, and on its actuating movement passing across the path of the idle selector, thereby acting as a stop to prevent the movement of such idle selector; and means for moving said actuator.

14. An organ having a plurality of rockers controlling the action of stops, departments, and couplers of the organ, and a plurality of traces selectively acting upon said rockers, in combination with a restoration trace coöperating with all the said rockers to restore any rocker to its normal position; a relatively movable selector for said restoration trace; an actuator common to all the traces; a solenoid moving said selector into the path of the said actuator; a pneumatic motor connected with the actuator to move it; an electric valve controlling said motor; an electro-magnet; means for energizing said electro-magnet; and two contacts governed by said magnet to make and break electric circuits, one of said contacts controlling the circuit of the electric valve for said pneumatic motor, and the other being in circuit with said solenoid.

15. An organ having a plurality of controlling rockers, and a plurality of traces selectively acting upon said rockers, in combination with a restoration trace coöperating with all the said rockers to restore any rocker to its normal position; a relatively movable selector for said restoration trace; an actuator for said restoration trace; a solenoid moving said selector into the path of the said actuator; means for moving said actuator; an electro-magnet; means for energizing said electro-magnet; and a contact governed by said magnet to make and break a circuit which includes said solenoid.

16. An automatic organ having, a tracker having two rows of holes; two tube bars N and O, one for each row of tracker holes; pipes 25 and 26 leading from the tracker holes to channels in the tube bars; pneumato electric actions K on the tube bars communicating respectively with the channels in the tube bars; and an electric contact for each pneumato electric action of the tube bars; in combination with departmental selecting mechanism comprising two groups of chambers 31, 32, and 84, and 62 and 63; each chamber normally containing air under pressure and equipped with normally inoperable pneumato electric actions, and an electric contact for each; two sets of channels, one set for each group of chambers, each channel communicating with a pneumato electric action in each of the corresponding chambers; two sets of electric valves, one for each channel; an air supply box 30 for each set of electric valves; electric circuits, one for each of said electric valves, each circuit being governed by a pneumato electric action of the corresponding tube bar; an air control box 87 for each chamber and normally in communication therewith; an electric valve governing the communication between each control box and its chamber; automatic selecting mechanism controlled by certain of the pneumato electric actions on said tube bars and acting to actuate selectively said last-mentioned electric valves to vent said chambers and to cut off the supply of air thereto; electric circuits including the pneumato electric actions in the chambers of the departmental selecting mechanism; sounding devices; instrumentalities governing the action of such sounding devices; and electrical means in said last named circuits controlling said instrumentalities.

17. An automatic organ having, a tracker having two rows of holes; two tube bars, one for each row of tracker holes; pipes leading from the tracker holes to channels in the tube bars; pneumato electric actions on the tube bars communicating respectively with the channels in the tube bars; and an electric contact for each pneumato electric action of the tube bars; in combination with departmental selecting mechanism comprising two groups of chambers, each chamber normally containing air under pressure and equipped with normally inoperable pneumato electric actions and an electric contact for each; two sets of channels, one set for each group of chambers, each channel communicating with a pneumato electric action in each of the corresponding chambers; two sets of electric valves, one for each channel; an air supply box for each set of electric valves; electric circuits, one for each of said electric valves, each circuit being governed by a pneumato electric action of the corresponding tube bar; an air control box for each chamber and normally in communication therewith; an electric valve governing the communication between each supply box and its chamber; a circuit for each of said last mentioned electric valves; means controlling each of said circuits so as to vent said chambers respectively and to cut off the supply of air thereto; and sounding devices the action of which is determined by the pneumato electric action in the chambers of the departmental selecting mechanism.

18. An automatic organ having, a tracker having two rows of holes, and an electric circuit pneumatically controlled from each tracker hole; in combination with departmental selecting mechanism comprising two groups of chambers, each chamber normally containing air under pressure and equipped with normally inoperable pneumato electric actions and an electric contact for each; two sets of channels, one set for each group of chambers, each channel communicating with a pneumato electric action in each of the corresponding chambers; two sets of electric valves, one for each channel and each in one of the said pneumatically controlled electric circuits; an air supply box for each set of electric valves; an air control box for each chamber and normally in communication therewith; an electric valve governing the communication between each control box and its chamber; a circuit for each of said last mentioned electric valves; means controlling each of said circuits so as to vent said chambers and to cut off the supply of air thereto; and sounding devices the action of which is determined by the pneumato electric actions in the chambers of the departmental selecting mechanism.

19. An automatic organ having, in combination, departmental selecting mechanism comprising two groups of chambers; each chamber normally containing air under pressure and equipped with normally inoperable pneumato electric actions and an electric contact for each; two sets of channels, one set for each group of chambers, each channel communicating with a pneumato electric action in each of the corresponding chambers; two sets of electric valves, one for each channel; an air supply box for each set of electric valves; electric circuits, one for each of said electric valves; automatic means governing said circuits; an air control box for each chamber and normally in communication therewith; an electric valve governing the communication between each control box and its chamber; an electric circuit for each of said last mentioned electric valves; means controlling each of said circuits so as to vent said chambers and to cut off the supply of air thereto; sounding devices, controlling means therefor, and electric circuits controlled by said pneumato electric actions and governing the action of said controlling means.

20. An organ having, in combination, departmental selecting mechanism comprising two groups of chambers; each chamber containing pneumato electric actions and an electric contact for each; two sets of channels, one set for each group of chambers, each channel communicating with a pneumato electric action in each of the corresponding chambers; two sets of electric valves, one for each channel; an air supply box for each set of electric valves; electric circuits, one for each of said electric valves; means governing said circuits; an air control box for each chamber; an electric valve governing the communication between each control box and its chamber; an electric circuit for each of said last mentioned electric valves; means to control said circuits; and sounding devices controlled by said pneumato electric actions.

21. An organ having, in combination, departmental selecting mechanism comprising two groups of chambers; each chamber containing sound-controlling devices; inoperable pneumato electric actions and an electric contact for each; two sets of channels, one set for each group of chambers, each channel communicating with a pneumato electric action in each of the corresponding chambers; two sets of electric valves, one for each channel; an air supply box for each set of electric valves; electric circuits, one for each of said electric valves; means governing said circuits; means controlling the supply of air to said chambers; and sounding devices controlled by said pneumato electric actions.

22. An organ having a gang switch mechanism comprising a plurality of contact plates 184; a rocking bar 180 having a plurality of yielding contact fingers 189, one for each contact plate; a pneumatic motor 193 connected with said rocking bar; an air supply box 196; a normally open valve 198 controlling the supply of air from said box to said motor; a normally closed connected valve 199 controlling a vent from said motor; a pneumatic 200 connected with said valves; and an electric valve controlling the supply of air to said pneumatic; in combination with wires leading from said contact plates to organ controlling devices;

hand governed switches; wires leading from said switches to said contact fingers; a note-sheet contrdlled selecting mechanism; wires leading from said mechanism to the said contact plates; a hand controlled starting switch 204; and a circuit governed by said switch and leading to said electric valve.

23. An organ having a gang switch mechanism comprising a plurality of contact plates; a rocking bar having a plurality of yielding contact fingers, one for each contact plate; and a pneumatic motor connected with said rocking bar; in combination with wires leading from said contact plates to organ controlling devices; hand governed switches; wires leading from said switches to said contact fingers; a note-sheet controlled selecting mechanism; wires leading from said mechanism to the said contact plates; a hand controlled starting switch; a circuit governed by said switch; and electric means in said circuit controlling the admission of air to said pneumatic motor.

24. An organ having a gang switch mechanism comprising a plurality of contact plates; and a plurality of yielding contact fingers, in combination with wires leading from said contact plates to organ controlling devices; wires leading from hand governed switches to said contact fingers; a note-sheet controlled selecting mechanism; wires leading from said mechanism to the said contact plates; a hand-controlled starting switch; and electric means governed by said switch acting to move said fingers away from said contact plates.

25. An automatically and manually played organ having, in combination; two manuals of keys; a pedal clavier; a tracker with two sets of holes; primary chests T, M, and W, for the manuals and pedal clavier respectively, each primary chest having valves, one for each coöperating key or pedal, a pneumato electric action for each valve, a channel leading from each valve to each action, and a contact for each action; a channeled tube bar for each row of tracker holes; a pneumato electric action for each channel in each tube bar; a contact for each action; a pipe leading from each tracker hole to one of the tube bar channels; departmental selecting mechanism comprising two groups of chambers, each chamber normally containing air under pressure and equipped with normally inoperable pneumato electric actions and an electric contact for each; two sets of channels, one set for each group of chambers, each channel communicating with a pneumato electric action in each of the corresponding chambers; two sets of electric valves, one for each channel; an air supply chest for each set of electric valves; electric circuits, one for each of said electric valves, each circuit being governed by a pneumato electric action of the corresponding tube bar; an air control box for each chamber and normally in communication therewith; an electric valve governing the communication between each control box and its chamber; automatic selecting mechanism controlled by certain of the actions on said tube bars, and acting to actuate selectively said last mentioned electric valves to vent said chambers and to cut off the supply of air thereto; three intermediate chests U, Q, and J, each having a plurality of electric valves, a plurality of outlet-controlling valves, pneumatic means controlled by the electric valves and governing the outlet valves, and a plurality of pipes leading from each outlet valve; electric circuits controlled by pneumato electric actions of each primary chest and also by the pneumato electric actions of each group of the departmental chambers and governing the electric valves of the intermediate chests; a coupler R, having channels to which lead said pipes from the intermediate chests, three sets of pneumato electric actions, a channel leading from each action to the coupler, and a contact for each action; main wind chests D, E, and F; relay chests V, S, and Y, therefor respectively; a plurality of valves in each relay chest controlling air passages of the main chests; a pneumatic for each valve; an electric valve for each pneumatic; and a circuit connection including each electric valve and one of the pneumato electric actions of the coupler.

26. An automatically and manually played organ having, in combination; two manuals of keys; a tracker with two sets of holes; a primary chest for each manual having valves, one for each coöperating key, a pneumatic electric action for each valve, a channel leading from each valve to each action, and a contact for each action; a channeled tube bar for each row of tracker holes; a pneumato electric action for each channel in each tube bar; a contact for each action; a pipe leading from each tracker hole to one of the tube bar channels; departmental selecting mechanism comprising two groups of chambers; each chamber normally containing air under pressure and equipped with normally inoperable pneumatic electrodes and an electric contact for each; two sets of channels, one set for each group of chambers, each channel communicating with a pneumato electric action in each of the corresponding chambers; two sets of electric valves, one for each channel; an air supply chest for each set of electric valves; electric circuits, one for each of said electric valves, each circuit being governed by a pneumato electric action of the corresponding tube bar; an air control box for each chamber and normally in communication therewith; an electric valve governing the communication between each control box and its chamber; automatic selecting mechanism controlled by certain of the pneumato electric actions on said tube bars, and acting to actuate selectively said last mentioned electric valves to vent said chambers and to cut off the supply of air thereto; an intermediate chest for each manual having a plurality of electric valves, a plurality of outlet controlling valves, pneumatic means controlled by the electric valves and governing the outlet valves, and a plurality of pipes leading from each outlet valve; electric circuits controlled by pneumato electric actions of each primary chest and also by the pneumatic electrodes of each group of the departmental chambers and governing the electric valves of the intermediate chests; a coupler having channels to which lead said pipes from the intermediate chests, two sets of actions, a channel leading from each action to the coupler, and a contact for each pneumato electric action; the great and swell main wind chests; a relay chest for each main chest; a plurality of valves in each relay chest controlling air passages of the corresponding main chest; a pneumatic for each valve; an electric valve for each pneumatic; and a circuit connection including each electric valve and one of the pneumato electric actions of the coupler.

27. An automatically and manually played organ having, in combination; two manuals of keys; a tracker with two sets of holes; a primary chest for each manual having valves, one for each coöperating key, a pneumato electric action for each valve, a channel leading from each valve to each action, and a contact for each action; a pneumato electric action for each tracker hole; a contact for each action; a pipe leading from each tracker hole to its action; departmental selecting mechanism comprising two groups of chambers; each chamber containing pneumato electric actions and an electric contact for each; two sets of channels, one set for each group of chambers, each channel communicating with a pneumatic electric action in each of the corresponding chambers; two sets of electric valves, one for each channel; an air supply chest for each set of electric valves; electric circuits, one for each of said electric valves, each circuit being governed by one of the electric actions communicating with the tracker; an air control box for each chamber; an electric valve governing the communication between each control box and its chamber; automatic selecting mechanism controlled by certain of the pneumatic electrodes communicating with the tracker and acting to actuate selectively said last mentioned electric valves; an intermediate chest for each manual having a plurality of electric valves, a plurality of outlet controlling valves, a plurality of outlet controlling valves, pneumatic means controlled by the electric valves and governing the outlet valves, and a plurality of pipes leading from each outlet valve; electric circuits controlled by pneumato electric actions of each primary chest and also by the pneumato electric actions of each group of the departmental chambers and governing the electric valves of the intermediate chests; a coupler having channels to which lead said pipes from the intermediate chests, pneumato electric actions, a channel leading from each action to the coupler, and a contact for each action; the great and swell main wind chests; a relay chest for each; a plurality of valves in each relay chest controlling air passages of the corresponding main chest; a pneumatic for each valve; an electric valve for each pneumatic; and a circuit connection including each electric valve and one of the pneumato electric actions of the coupler.

28. An automatically and manually played organ having, in combination; two manuals of keys; a tracker with two sets of holes; a primary chest for each manual having valves, one for each coöperating key, a pneumato electric action for each valve, a channel leading from each valve to each action; and a contact for each electrode; a pneumato electric action for each tracker hole; a contact for each action; a pipe leading from each tracker hole to one of said actions; departmental selecting mechanism comprising two groups of chambers, each chamber having pneumatic electrodes and an electric contact for each; two sets of channels, one set for each group of chambers, each channel communicating with a pneumato electric action in each of the corresponding chambers; two sets of electric valves, one for each channel; an air supply chest for each set of electric valves; electric circuits, one for each of said electric valves, each circuit being governed by one of the actions communicating with the tracker; automatic means selectively bringing said departmental chambers into action; an intermediate chest for each manual having a plurality of electric valves, a plurality of outlet controlling valves, pneumatic means controlled by the electric valves and governing the outlet valves, and a plurality of pipes leading from each outlet valve; electric circuits controlled either by pneumato electric actions of each primary chest or by pneumato electric actions of each group of the departmental chambers and governing the electric valves of the intermediate chests; a coupler having channels to which lead said pipes from the intermediate chests, pneumato electric actions, a channel leading from each action to the coupler, and a contact for each action; the great and swell main wind chests; a relay chest for each main chest; a plurality of valves in each relay chest controlling air passages of the corresponding main chests; a pneumatic for each valve; an electric valve for each pneumatic; and a circuit connection including each electric valve and one of the pneumato electric actions of the coupler.

29. An automatically and manually played organ having, in combination; two manuals of keys; pedals; primary chests for the manuals and the pedals respectively, each primary chest having valves, one for each coöperating key or pedal, a pneumato electric action for each valve, a channel leading from each valve to each action, and a contact for each action; departmental selecting mechanism comprising two groups of chambers, each chamber normally containing air under pressure and equipped with normally inoperable pneumato electric actions and an electric contact for each; two sets of channels, one set for each group of chambers, each channel communicating with a pneumato electric action in each of the corresponding chambers; two sets of electric valves, one for each channel; an air supply chest for each set of electric valves; electric circuits, one for each of said electric valves; automatic means selectively bringing the departmental chambers into action and actuating said electric valves; an intermediate chest for each manual having a plurality of electric valves, a plurality of outlet controlling valves, pneumatic means controlled by the electric valves and governing the outlet valves, and a plurality of pipes leading from each outlet valve; electric circuits controlled either by pneumato electric actions of each primary chest or by pneumato electric actions of each group of the departmental chambers and governing the electric valves of the intermediate chests; and sounding devices controlled through said pipes.

30. An organ having, in combination; two manuals of keys; a primary chest for each manual having valves, one for each coöperating key, an action for each valve, a channel leading from each valve to each pneumato electric action; and a contact for each action; an intermediate chest for each manual having a plurality of electric valves, a plurality of outlet controlling valves, pneumatic means controlled by the electric valves and governing the outlet valves, and a plurality of pipes leading from each outlet valve; electric circuits controlled by pneumato electric devices of each primary chest and governing the electric valves of the intermediate chests; a coupler having channels to which lead said pipes from the intermediate chests, pneumato electric actions, a channel leading from each pneumato electric action to the coupler, and a contact for each action; the great and swell main wind chests; a relay chest for each main chest; a plurality of valves in each relay chest controlling air passages of the main chests; a pneumatic for each valve; an electric valve for each pneumatic; and a circuit connection for each electric valve to one of the pneumato electric actions of the coupler.

31. An automatically and manually played organ having, in combination; keys; a primary chest having valves, one for each coöperating key, a pneumato electric action for each valve, a channel leading from each valve to each action, and a contact for each action; departmental selecting mechanism comprising two chambers; each chamber containing pneumato electric actions and an electric contact for each; two sets of channels, one set for each chamber, each channel communicating with a pneumato electric action in the corresponding chamber; two sets of electric valves, one for each channel; an air supply chest for each set of electric valves; electric circuits, one for each of said electric valves; automatic means selectively bringing said chambers into action and actuating said electric valves; an intermediate chest having a plurality of electric valves, a plurality of outlet controlling valves, pneumatic means controlled by the electric valves and governing the outlet valves, and a plurality of pipes leading from each outlet valve; electric circuits controlled either by pneumato electric actions of the primary chest or by the pneumato electric actions of each departmental chamber and governing the electric valves of the intermediate chests; and sounding devices controlled through said tubes.

32. An automatically and manually played organ having, in combination; keys; a primary chest having valves, one for each coöperating key, an electric circuit controlled by each of said valves; departmental selecting mechanism comprising two chambers, each chamber having electric switches; automatic mechanism for bringing said chambers selectively into action and for actuating the switches therein; an electric circuit controlled by each switch; an intermediate chest having a plurality of electric valves, each valve being controlled either by one of the primary chest circuits or by a circuit of one of the switches in both of said departmental chambers; and sounding devices controlled from said intermediate chest.

33. An organ having a tracker; electric circuits governed thereby; variable pressure chambers; and a valve controlling each chamber; in combination with chamber selecting mechanism comprising a plurality of traces and of controlling rockers actuated by said traces; means governed by each of said rockers to effect the movement of one of said valves; and means under the control of said electric circuits governed by the tracker for selectively moving said traces.

34. An organ having a tracker; variable pressure chambers; and a valve for each chamber; in combination with a chamber selecting mechanism comprising a plurality of traces and of controlling rockers actuated by said traces; means governed by each rocker to effect the movement of one of said valves; and means governed by the tracker for selectively moving said traces.

35. An organ having a plurality of controlling rockers; a plurality of traces selectively acting upon said rockers, and electrically controlled means for moving said traces, in combination with a restoration trace coöperating with all the said rockers to restore any rocker to its normal position; electrically controlled means for moving said restoration trace; a tracker; pneumatics communicating with the tracker; and electric circuits governed by said pneumatics which respectively include said trace-moving means.

36. An organ having a plurality of controlling rockers; a plurality of traces selectively acting upon said rockers; and electrically controlled means for moving said traces; in combination with a restoration trace coöperating with all of said rockers to restore any rocker to its normal position; electrical means governing the movement of said restoration trace; a tracker; and tracker and hand controlled switches which alternately govern the action of said electrically controlled means.

37. An automatic organ having, in combination, a tracker with music holes and with extra holes; pneumato electric actions; pipes leading from said extra holes to said pneumato electric actions respectively; a contact and electric circuit for each pneumato electric action; a hand controlled switch controlling the supply of electric current to all except one of said contacts; a selecting mechanism controlled by said pneumato electric actions, including a restoration device; and electric means governed by said circuits and controlling said selecting mechanism, the circuit which governs the controlling means for the restoration device including the pneumato electric action which is not affected by said switch.

38. An automatic organ having, in combination, a tracker with music holes and with extra holes; pneumato-electric actions; pipes leading from the music holes and the extra holes to said pneumato electric actions respectively; a contact and circuit for each pneumato electric action; a selecting mechanism having actuating means, said means being controlled by the pneumato electric actions governed by the extra holes; and a hand controlled switch controlling the supply of electric current only to said contacts of the pneumato electric actions governed by the extra holes, whereby the music holes may still act when the extra holes are rendered inactive.

39. An automatic organ having, in combination, a tracker with music holes and with extra holes; an electric switch for each hole; a selecting mechanism having actuating means, said means being controlled by said switches governed by the extra holes; and a hand controlled switch controlling the supply of electric current only to the switches governed by the extra holes, whereby the music holes may still act when the extra holes are rendered inactive.

40. An organ having, in combination, a tracker with extra holes under the control of a perforated note sheet; variable pressure chambers; and selecting mechanism acting to control selectively said chambers, said selecting mechanism having actuators controlled by the extra holes in the tracker, and each coöperating extra hole of the tracker serving by itself to govern more than one actuator and thereby more than one combination of variable pressure chambers as the result of the recurrence of the corresponding extra hole in the note sheet.

41. An organ having, in combination, a tracker with extra holes; variable pressure chambers; selecting mechanism acting to control selectively said chambers, said selecting mechanism having actuators controlled by said extra holes, each coöperating extra hole serving by itself to govern in succession two actuators and hence two different combinations of variable pressure chambers, as the result of the recurrence of the corresponding extra hole in the note sheet.

42. An organ having a plurality of controlling rockers, a plurality of traces selectively acting upon different groups of said rockers, and note sheet controlled means operating during the advance of the note sheet and governing the action of said traces, in combination with a restoration trace operating upon all the said rockers to restore any rocker to its normal position, and note sheet controlled means governing the action of said restoration trace after the completion of the playing under the control of the note sheet.

43. An organ having, in combination, departments; mechanism for selectively bringing into action the departments as such, said mechanism comprising two groups of variable pressure chambers, each group including a plurality of such chambers; automatic mechanism selectively bringing said chambers into action; and hand controlled mechanism alternatively bringing said chambers selectively into action.

44. An automatically and hand played organ having, in combination, variable pressure chambers; means for automatically controlling said chambers; hand manipulated switches each also controlling one of said chambers; and a gang switch which cuts out all the hand manipulated switches when the organ is to be played entirely automatically.

45. An automatically and hand played organ having a manual and a tracker for a note sheet, in combination with an intermediate chest having means for controlling the sounding devices; a primary chest between the manual and the intermediate chest; operative connections between the keys of the manual and the primary chest and between the primary chest and the intermediate chest so that when a key is played a controlling device within the intermediate chest will be actuated; a tube bar between the tracker and the intermediate chest; and connections between the tracker holes and the tube bar and between the tube bar and the intermediate chest, said connections being independent of and separate from the primary chest, so that when a hole in the tracker is exposed by the note sheet the corresponding sound controlling device in the intermediate chest will be actuated independently of the primary chest.

46. A note sheet played organ having a tracker with extra holes controlled by corresponding extra holes in the note sheet, and a stop selecting mechanism, in combination with actuators for said selecting mechanism, and intervening mechanism between said extra holes and said actuators, a plurality of said actuators, through said intermediate connections, being selectively under the control of a single extra hole in the tracker.

47. An automatically played organ having a tracker with extra holes registering with corresponding holes in a perforated note sheet, each of which extra holes is adapted to select more than one group of stops depending upon the recurrence of the corresponding hole in the note sheet, in combination with selecting mechanism, and intervening devices between it and said extra holes of the tracker, said devices being controlled through said holes and in turn actuating the selecting mechanism.

48. An automatically and hand played organ having, in combination, stop and department variable pressure chambers; hand manipulated switches each also controlling one of said chambers; and a gang switch which cuts out all the hand manipulated switches when the organ is to be played entirely automatically.

In witness whereof, I have hereunto signed my name.

WILLIAM E. HASKELL.